(12) United States Patent
Riggs

(10) Patent No.: US 7,299,067 B2
(45) Date of Patent: Nov. 20, 2007

(54) METHODS AND SYSTEMS FOR MANAGING THE PROVISION OF TRAINING PROVIDED REMOTELY THROUGH ELECTRONIC DATA NETWORKS TO USERS OF REMOTE ELECTRONIC DEVICES

(76) Inventor: Lee Riggs, 1615 Westop Trail, Knoxville, TN (US) 37923

( * ) Notice: Subject to any disclaimer, the term of this patent is extended or adjusted under 35 U.S.C. 154(b) by 496 days.

(21) Appl. No.: 10/269,259

(22) Filed: Oct. 11, 2002

(65) Prior Publication Data

US 2003/0074558 A1   Apr. 17, 2003

Related U.S. Application Data

(60) Provisional application No. 60/329,088, filed on Oct. 12, 2001.

(51) Int. Cl.
*H04Q 7/20* (2006.01)
(52) U.S. Cl. .................. 455/556.2; 455/557; 370/292
(58) Field of Classification Search ............... 455/403, 455/414.1, 407–408, 418, 419, 424, 412.1, 455/556.1, 556.2, 557, 550.1, 411; 370/292, 370/208, 210, 219, 335, 441; 707/1
See application file for complete search history.

(56) References Cited

U.S. PATENT DOCUMENTS 6,353,604 B2 * 3/2002 Grimwood et al. ......... 370/335
6,665,308 B1 * 12/2003 Rakib et al. ................ 370/441
2002/0049709 A1 * 4/2002 Miyasaki et al. ............. 707/1
2004/0131011 A1 * 7/2004 Sandell et al. .............. 370/210

* cited by examiner

*Primary Examiner*—CongVan Tran
(74) *Attorney, Agent, or Firm*—Ortiz & Lopez; Luis M. Ortiz; Kermit D. Lopez

(57) ABSTRACT

Methods and systems for providing and managing training through/over networks to remote multimedia device users are disclosed. Training can be provided through networks to computers and portable hand held devices. Handheld devices can include PDAs, pagers, and wireless phones. Training can be received by a remote trainee through electronic data networks for completion at a wireless device. Methods and systems are also disclosed for managing remote training. Remote training can be tracked and recorded when completed by a remote user of a wireless hand held device. Completed training can be transmitted through an electronic network to course provider servers by a remote hand held device. Remote users authentication and certification of completed training received from a hand held device through an electronic network can be conducted by a training provider's server. Training providers can identify and/or authenticate users of completed instruction and training received from a hand held device and transmitted through an electronic network using biometrics. Completed training can certified by sending certification of training results to trainees and associated third parties. Certification can be provided via electronic means that can include e-mail receipt and/or automatic generation of paper-based communication (e.g., letter/certificate).

18 Claims, 32 Drawing Sheets

ABOUT US

| Our Company | Investor Relations | Become A Course Author |
|---|---|---|
| Our Officers And Board | Become An Alliances Member | Contact Us |

- About Us
- Help/Tutorial
- Student Lounge
- Course Register/Catalog
- State CLE Requirements
- Faculty
- Home

The Challenges of the Bar Associations

Course development is the most important issue facing Bar Associations in their effort to be competitive in the field of online CLE. Bar Associations need quality courseware that is user-friendly and of the highest educational value.

Development of these types of courseware can be time-consuming to create and costly to produce. Some associations have tried taking shortcuts with low-quality programming, only to find that they simply lose repeat sales to other vendors. The member continues to shop for the best product or, worse yet, the member simply chooses not to "Log-On" for his/her CLE.

Creating a successful format is an on-going evolution that gently brings the user with it. The user should always be challenged by the content of the course and NEVER by the process. A successful program must have an ample selection of courseware and a plan to expand and update the inventory, as demand requires. You can't sell from an empty shelf or a shelf full of yesterday's products.

A wide selection of top-quality courseware delivered in an easy and consistent interface is what your member is looking for, willing to pay for, and most importantly, what they will keep coming back for!

The Solution - LawyersLearn.Com

Forming a strategic alliance with LawyersLearn.com will allow your Bar Association to offer your membership top-quality education at minimum cost and allow your Bar Association a potential for an excellent revenue stream. Courseware will continue to be developed by our Alliance Members, our independent Attorney Contractors and in-house professors.

The Program

Brand Name
Your Bar Association will select and use your own University Name, you will be supplied a Web address and Internet Domain that will invisibly point to the LawyersLearn.com learning center. When your members access your University from your assigned address, all university & bar logos and artwork will identify your Association.

We will create an Online University brand that will be yours and yours alone. When users log into your university via the provided web address they will see your identity not that of a vendor. We believe it is important that the users always feel they are visiting an extension of your web site rather than an off-site third party. Our goal is not just to provide online CLE but to help you create a true member benefit. Your branding is also important, in case at the end of your contract period you decide not to renew, *you will be able to take your now established brand and continue*

*Fig. 13*

HELP / TUTORIAL

- About Us
- Help/Tutorial
- Student Lounge
- Course Register/Catalog
- State CLE Requirements
- Faculty
- Home

Welcome! to the most user-friendly online CLE program on the internet! No doubt you've seen some programs so convoluted that it seems you should not only get a completion certificate, but qualify for your pilots license at the same time. This Help / Tutorial section was designed to give you easy "one-click" access to the answers of the most frequently asked questions. If after reviewing you still have questions, our tech support team can be reached LIVE on-line through the "student lounge" link at the left. Click on the links below to begin, and thank you again for selecting us as your on-line CLE provider.

1401
Let's Begin!
Brief overview of the course and how to begin.

1402
Your Course

1403
Registration!
Registration is a snap! Click here to find out more!

1404
Take A Course Tour!
Take a quick course tour and you'll agree that this is the easiest on-line CLE ever!

1405
How Do I .... ?
Click on the links below to find the answers to some of the most frequently asked questions.

Book-Mark A Page ←⟵ 1411
Contact Course Authors ←⟵ 1412
Contact Technical Support ←⟵ 1413
Download Course Materials ←⟵ 1414

1406
Miscellaneous Stuff
Plug-in support and browser compatibility are answered below in our easy click-through interface.

*Fig. 14A*

Course Tutorial

This page gives you on overview of the navigational buttons and course instruction to help you get the most out of your Online CLE Course.

Getting Started:

We realize that busy schedules mean that you may not complete your course in one sitting, so to simplify the "log on" process we utilize "cookies" to assist you. Once you have registered for the course, you will be provided a "username" and "password". If you leave the site, upon your return to our home page you will see the following graphic: ⌐ 1802

Welcome Back, Click here to rejoin your Class.

Once selected, you will be returned to your course at the place you left off.

Navigating The Course:

As you begin the course you will notice several navigational buttons designed to easily move you through the course. Read the query and select the response you feel is the most appropriate by clicking on the button of your choice. Once your choice is made you will automatically move to the answer page where our online "Judge" will review your response. Course navigational buttons include:

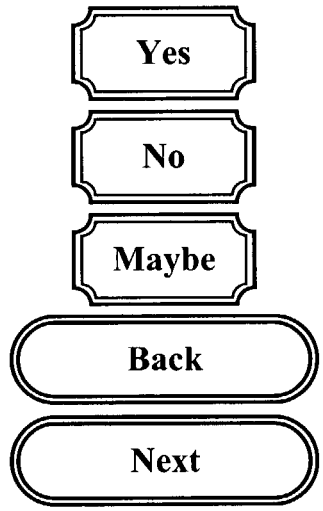

YES: Click if you feel this is the best response to the query

NO: Click if you feel this is the best response to the query

MAYBE: Click if you feel this is the best response to the query ⎬ 1801

BACK: Click to return to the last visited page

NEXT: Click to advance to the next page

⌐ 1803

YOU'RE CORRECT: Your selected answer to the query was the correct response!

*Fig. 18*

Course Tutorial

↙ 1901

YOU'RE INCORRECT:
Your selected answer to the query was the incorrect response!

Also:         ↙ 1902

- The case law relevant to the question have been linked for your convenience.

- Each course was designed to take an average of 1 hour to complete, however your modem speed may affect time.

- At the end of the course you will automatically be taken to the course :Post Test". ⬅ 1903

- Upon satisfactory completion of the "Post Test" you will be issued a certificate of completion

---

NEED MORE ASSISTANCE?                    ↙ 1905

For additional questions or information, click to contact our support staff.

| Close Window |

*Fig. 19*

Course Introduction

The first page of the course begins with a "Course Introduction

The Course Introduction gives you an overview of the selected course. It explains the course objectives and how the course will proceed.

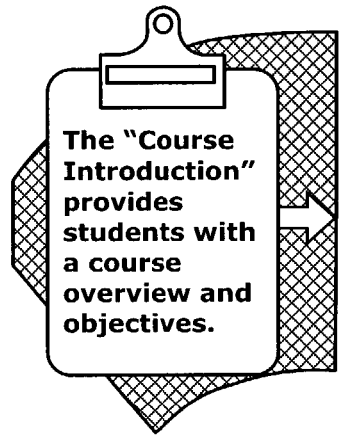

Generally, most of the courses provide a series of fact situations that present you with various dilemmas. You will then be required to answer a question stemming from the dilemma with either "Yes", "No", or "Maybe" . In some cases this may not be entirely fair, but then a lot of things are not "fair". The objective is to present the issues for your deliberation in an informative, yet entertaining manner.

⎫
⎬ 2001
⎭

The "Course Introduction" provides students with a course overview and objectives.

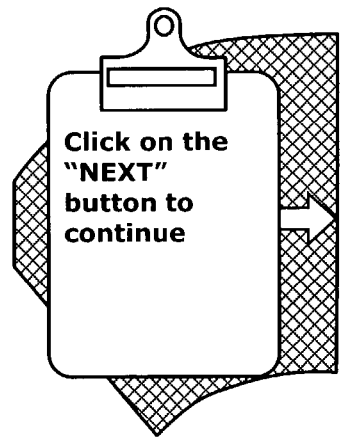

Click on the "NEXT" button to continue

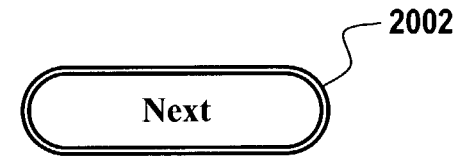

Your Schedule, Your Pace!

You may leave and re-enter the course at anytime, enabling you to take the course as YOUR schedule dictates. Once you begin the course, should you log off our site, upon return you will be asked if you wish to rejoin your class. Click the link, and you will automatically return to where you left off.

If you have registered, but have not yet begin the course, you may begin the course at any time by clicking on the "classroom" button and selecting the course you have registered for. You will be then prompted for your class username and class password

That's It!

Once you have finished the course you will complete a short online post-test and be given information on how to obtain your course completion certificate.

Thank You!

for selecting us for you online CLE provider. We welcome your suggestions, comments, or feedback. If we can provide any additional information please <u>Contact Our Technical Support Staff</u>.

| Close Window |

*Fig. 26*

STUDENT LOUNGE

- About Us
- Help/Tutorial
- Student Lounge
- Course Register/Catalog
- State CLE Requirements
- Faculty
- Home

Welcome To Our Student Lounge

Please choose the Lounge to log into based on your Internet Connection Speed.

2701

Connect to Student Lounge #1

This link is for students with a FAST Internet connection (ISDN or faster).
– *Sounds and Graphics*

2702

Connect to Student Lounge #2

This link is for students with a SLOW Internet connection (Modems 28 – 56K). – No *Sounds or Graphics*

Questions, comments, or difficulties, please contact our support staff

*Fig. 27*

REGISTRATION/CLASSROOMS

- About Us
- Help/Tutorial
- Student Lounge
- Course Register/Catalog
- State CLE Requirements
- Faculty
- Home

General Law Courses

Our course selection includes courses from nationally-known authors on such varied subjects as ethics, evidence, mediation, and the law governing non-profit corporations

| *COURSE TITLE | REGISTRATION OPTIONS | COURSE SYNOPSIS | RESUME COURSE |
|---|---|---|---|
| *ADA and the Workplace | Secure Registration / Un-Secure Registration | Synopsis | Resume |
| *Advocacy Ethics | Secure Registration / Un-Secure Registration | Synopsis | Resume |
| *Basics of Patent Law | Secure Registration / Un-Secure Registration | Synopsis | Resume |
| *Character Evidence | Secure Registration / Un-Secure Registration | Synopsis | Resume |
| *Copyright in a Nutshell | Secure Registration / Un-Secure Registration | Synopsis | Resume |
| *Evidence/Hearsay 101 | Secure Registration / Un-Secure Registration | Synopsis | Resume |
| *Evidence/Hearsay 102 | Secure Registration / Un-Secure Registration | Synopsis | Resume |
| *Evidence/Hearsay 103 | Secure Registration / Un-Secure Registration | Synopsis | Resume |
| *Evidence/Relevance 101 | Secure Registration / Un-Secure Registration | Synopsis | Resume |
| *Introduction to Arbitration | Secure Registration / Un-Secure Registration | Synopsis | Resume |
| *Introduction to Article 9 | Secure Registration / Un-Secure Registration | Synopsis | Resume |

*Fig. 30*

FACULTY

Meet Your Instructors

- About Us
- Help/Tutorial
- Student Lounge
- Course Register/Catalog
- State CLE Requirements
- Faculty
- Home

| Name | |
|---|---|
| LANCE B. BRACY | Biography |
| JACK BURGIN | Biography |
| SCOTT D. GAREY | Biography |
| LAURA CHASTAIN | Biography |
| RICHARD L. HOLLOW | Biography |
| KERMIT LOPEZ | Biography |
| JOE E. MANUEL | Biography |
| JAMES MOORE | Biography |
| JUDGE ROBERT MURRIAN | Biography |
| LUIS M. ORTIZ | Biography |
| PAM REEVES | Biography |

JAMES MOORE, ESQ.

| Biography | Picture | Audio Interview | Close Window |

3203  3202  3204

James R. Moore is a partner in the Knoxville, Tennessee law firm of Moore & Brooks. His practice includes commercial litigation, bankruptcy and creditors' rights. Mr. Moore has extensive experience in complex financial litigation and RICO actions involving fraud, fraudulent transfers and off-shore entities, representing both plaintiffs and defendants. In cases involving the investigation of alleged criminal activities, Mr. Moore has worked closely with the U. S. Attorney's office, the State Attorney General's office, the Federal Bureau of Investigation, the Internal Revenue Service, and the Tennessee Bureau of Investigation.

Mr. Moore is currently the East Tennessee Governor to the Tennessee Bar Association Board of Governors. He was the first Chief-Editor of TBALink, (the Tennessee Bar Associations World Wide Web site); Chairman of the TBA's Future-CLE Committee, (developing a prototype on-line CLE course); the first Dean of the Tennessee Bar Association's on-line University; Member, Tennessee Bankers Association Electronic Signature Task Force; and, a member of the University of Tennessee College of Law Alumni Advisory Counsel. He has lectured and written articles on ethics, electronic transactions, Internet research and Internet resources.

Mr. Moore is admitted to practice in the State of Tennessee, the United States District Court, and the United States Court of Appeals for the 6th Circuit. He received his legal education at the University of Tennessee (J.D. 1977).

AvantGo

| HOME | PRODUCT & SERVICES | SUPPORT | PARTNERS | NEWS | EVENTS | COMPANY | HOW |

MY ACCOUNTS
MYCHANNELS
AVANTGO WIRELESS
ACCOUNT SETTINGS
SOFTWARE SETUP
SYNC LOG

My CHANNELS

BACK TO CHANNEL

| | CURRENT |
|---|---|
| ☐ CLE2 Go Evidence/Hearsay 101 | 133k |
| ☐ CNNfn | 27k |
| ☐ Forbes.com | 2k |
| ☐ The Wall Street Journal | 46k |

3601 ← (pointing to Hearsay 101)
3602 ← (pointing to Forbes.com checkbox)

DELETE CHECKED — 3603

---

Create Custom Channel Wizard
Use the easy, step-by-step wizard to add your own favorite website to your handheld device.

Create Custom Channel Classic
Add your own favorite website to your handheld device using the classic channel creation interface.

AvantGo AutoChannels™
Create a channel for your handheld while surfing just by clicking a button or choosing a bookmark.

Export Channels
Generate URLs which can be used to add your channels to anyone's account.

Import AvantGo Version 1.x Channels
Migrate older channels data files for viewing on the latest AvantGo software.

*Fig. 36*

METHODS AND SYSTEMS FOR MANAGING THE PROVISION OF TRAINING PROVIDED REMOTELY THROUGH ELECTRONIC DATA NETWORKS TO USERS OF REMOTE ELECTRONIC DEVICES

PRIORITY TO PREVIOUSLY FILED PROVISIONAL APPLICATION

The present invention claims priority to a previously filed Provisional Patent Application, Ser. No. 60/329,088, entitled "Methods and systems for providing education, instruction and/or training through an electronic network to end user computers and/or hand held devices," which was filed on Oct. 12, 2001 and is herein incorporated by reference.

TECHNICAL FIELD OF THE INVENTION

The present invention is generally related to methods and systems for electronically providing education, instruction and/or training to remote end-users. Furthermore, the present invention is related to electronic methods and systems for managing remote training activities, including providing accreditation support to professionals, such as, for example, attorneys, accountants, doctors, engineers, nurses, and so forth. More particularly, the present invention is related to methods and systems for carrying out at least one of: remotely providing training, remotely completing training, registering users, authenticating users, managing remote training, and certifying completion of remote training. The present invention is also related to the use of wireless electronic hand held devices, such as Personal Digital Assistants (PDAs), pagers, mobile phones and other data network-enabled portable wireless devices for providing and carrying out remote training.

BACKGROUND OF THE INVENTION

Today, seemingly more than in the past, companies are discovering that the general work force is ill-equipped and ill-trained, through a lack of formal training, prior work experience, or participation in apprenticeship programs, to perform necessary job-related tasks. Companies are also discovering that ill-trained workers fall into two major categories including a first category of workers who are new to a company's industry and who have none of the necessary skills to perform tasks of interest on behalf of their companies.

In order to accomplish the task of providing training to employees, many companies send their employees to training programs, which are generally developed and conducted by an in-house training department or may be a function under contract to an outside firm to deliver company-specific content designed to meet company-defined training objectives. A company may also send its workers to training programs, conducted by outside firms or organizations that are designed to generically train employees of a certain industry in a particular subject or task associated with their employment.

Regardless of who develops, designs, and/or conducts a training program, such programs typically require that an employee attend a number of training sessions at a selected training site. Unfortunately, the training site is often distant from the employee's normal workplace (particularly when the training program is conducted by an outside firm or organization not under contract to the employee's company) and the training sessions are often on days and at times that do not conveniently fit into the employee's schedule. As a result, the employee may have to travel between the training site and the workplace and may possibly have to stay overnight near the training site.

By requiring the employee to travel and to attend training sessions on inconvenient days and at inconvenient times, the employee's personal and professional lives can also be interrupted, potentially upsetting or distracting the employee and reducing his/her ability to learn new skills. Additionally, the employee's company typically incurs direct expenses related to the employee's travel and indirect expenses associated with the opportunity cost of work not being accomplished while the employee is at the training site or while the employee travels to and from the training site.

The professional ranks are also seeing a need for a more efficient means to undergo training. For example, Continuing Legal Education ("CLE") had found its way to the Internet with well-known service providers such as LawyersLearn.com, Inc. LawyersLearn.com is currently delivering online continuing legal education to attorneys, whom are well known as a group to have limited time to attend live courses. Online CLE is a very reasonable alternative to live CLE seminars as a means for attorneys to complete their annual Minimum Continuing Legal Education (MCLE) requirements (required by most State Bars).

Training material offered by typical training programs can generally include presentations by individuals having certain relevant knowledge or expertise, "how-to" demonstrations, and "hands-on" training exercises. Such training sessions, especially if conducted without adequate company control, are often too long in duration and present too much training material, thereby causing many trainees to lose concentration and, otherwise, causing them to fail to comprehend and absorb the material. To make matters worse, it can be impossible to evaluate a trainee's comprehension and understanding of the training material provided in such training sessions without evaluation. Without feedback, it can be difficult to determine whether or not additional training is necessary and, if so, it can be difficult to conduct immediate reinforcement training. Furthermore, unless a training program is developed in-house or under contract, the content of such training sessions may include material not relevant to, or up to date with, the objectives of a company.

Many companies have also attempted to overcome disadvantages associated with trainees having to travel to attend training programs by offering satellite-based instruction at the trainee's place of business. Unfortunately though, satellite-related equipment for satellite-based instruction is relatively expensive and is, therefore, often only available to a trainee in a specially equipped training room. As a result, the trainee must still leave his/her work site (i.e., desk, workstation, etc.) to perform training. Also, because a company may only have one specially equipped training room, the trainee generally must schedule use of the room or attend a scheduled satellite-based training session at time. Some companies have attempted to overcome this scheduling difficulty by recording the satellite-based training sessions on videotape for later playback. Unfortunately though, the use of videotape does not alleviate the need for a trainee to leave his/her workstation in order to travel to a specially equipped training room to view the videotape.

With regard to the profession ranks, LawyersLearn.Com, Inc. is among a few CLE providers currently addressing the need for online training and education for busy legal professionals. But the legal community is not alone when it comes to training and educational needs. The medical, financial and technical professions also have a need for continuing education typically delivered through live training seminars, but which could be fulfilled through alternative, remote means.

Computers have become pervasive in all aspects of the business and educational worlds. Computers allow for the generation, storage, retrieval, and interaction with data in useful ways. For example, business uses allow for large amounts of data to be correlated together in the form of databases or spread sheets that allow a user to categorize and view relationships more rapid than was previously possible without the aid of the computer. Computers have also allowed for the dissemination of information either to limited groups or to large audiences via such communication channels as local area networks (LANs), wide area networks (WANs), and the Internet. Within this transmission of information, multimedia presentations have expanded to broaden the information dissemination and training opportunities available over LANs, WANs, and the Internet. The Internet has also provided interactivity where an Internet user is able to browse among various web sites for information. Upon finding a site of interest to the user, that site at times is able to glean information from the user that would be helpful for the web provider in a commercial or social context.

Hand held computing devices (i.e., hereinafter referred to as "hand held devices" or "handheld devices") are becoming increasingly popular for storing and maintaining information. One of the first major advances in handheld mobile computer technology was the Personal Digital Assistant (PDA). A PDA allows a user to access computer related information, yet it can fit into the palm of the user's hand. Utilizing a PDA a user can organize personal affairs, write notes, calculate equations, and record contact numbers in an address book. In addition, PDA's are usually capable of interfacing with a desktop computer, typically through a wired connection. The connection allows the PDA to download information and upload information, with the desktop computer. Later developments have given the PDA wireless capabilities. Wireless capabilities allow PDAs to remotely interact with other PDA's/computers that are not physically connected to the PDA.

Although PDA's may be connected to a desktop personal computer or other PDA's via infrared, direct wire, or wireless communication links, PDA's and similar hand held devices can also be linked remotely to networks such as the Internet via local wireless resources, such as RF broadcasts or through available wireless communications techniques.

The most advanced data- and video-enabled wireless communication devices currently available in the marketplace take the form of a PDA (e.g., Palm Pilot™, Handspring Visor™, and Windows CE compatible hand held computers, such as the iPAQ™). Unlike personal computers, which are general-purpose devices geared toward refining and processing information, PDAs are designed to capture, store and display information originating from various sources. Additionally, while a certain level of skill is required to use a personal computer effectively, PDAs are designed with the novice and non-computer user in mind.

The present inventor has recognized the convenience that online training and education is bringing to busy workers and professional since the advent of the Internet. The present inventor, however, has also recognized that vast improvements in wireless technology can further enhance current offerings in online education and current training applications that are primarily focused on a "connected" or "wired" world, but physically connected systems and training application will also continue to experience an explosion of growth and improvement as more people begin to fully realize to positive impact that data networks have on everyday life.

The present inventor has realized that, what is needed in the training field is an interactive process that enables wireless education, instruction and/or professional development via portable, wireless handheld computer systems. The current invention enables users of hand held computers wirelessly coupled to a network (e.g., Internet) to engage in training (e.g., via a multimedia presentation), be evaluated on the understanding gained by the user after the training (e.g., interactive questioning), and allow for reporting (e.g., certification of course completion) of the results of a user's activity and evaluation to a course administrator. Training data can also be used to verify, evaluate, and enhance training, course, student and/or teacher performance and/or development. Training data can also be used for not only for professional or technical development, but could also be used as credit towards certification or even college credit. The present inventor has therefore developed new methods and systems for providing and managing the provision to and execution of training by users via handheld wireless devices as well as improvements for use of fixed, networked computers (wired devices) already deployed and familiar in the field of online education and training.

SUMMARY OF THE INVENTION

Use of the word "training" throughout the rest of this document should not be interpreted as limitation to the applicable scope of the present invention. Although the present invention is related to methods and systems for electronically providing education, instruction and/or training to end users, "training" will be used herein primarily to describe all forms of education, instruction and training that the present invention can broadly apply.

The ability to obtain information from various users of a training system and report that information back to, for example, a supervisor, an instructor (such as a teacher or professor), principal, administrator, regulatory or accrediting body, or employer of the trainee, in a meaningful and helpful manner for evaluation review of the trainee's understanding of the subject matter has been lacking in the art of networked computer-based training until most recently. Further, the supervisor of many users may also be interested in knowing more about how long users took to review the information, how the users performed in the evaluation, what level of interaction users had with the training, how the collective group or groups of trainers are doing, and so forth.

It is an aspect of the present invention to provide improved methods and systems for providing and managing training through electronic networks to remote computers.

It is another aspect of the present invention provides improved methods and systems for providing and managing training through electronic networks to hand held devices.

It is another aspect of the present invention that training be provided through an electronic network to hand held devices such as wireless PDAs, mobile phones and pagers.

It is another aspect of the present invention to provide methods and systems for users to receive training through hand held devices.

It is another aspect of the present invention to provide methods and systems for users to receive training through a network at a hand held device.

It is another aspect of the present invention to provide methods and systems for receiving training through an electronic network for completion on a wireless device.

It is another aspect of the present invention to provide methods and systems for receiving training through an electronic network for completion on a wireless device and for recording completed instruction and training through a network from a wireless device.

It is another aspect of the present invention to provide methods and systems for registering and authenticating users/trainees, and receiving and authenticating completed training from a users/trainees of remote devices, such as hand held devices, authentication occurring through an electronic data network.

It is another aspect of the present invention to provide methods and systems for authenticating completed training received from a hand held device and transmitted through an electronic network by verifying the identification of users.

It is another aspect of the present invention to provide methods and systems for authenticating completed training received from users of hand held device and transmitted through an electronic data network by verifying the identification of users using biometric authentication means.

It is another aspect of the present invention to provide methods and systems for certifying training as successfully completed through a hand held device by sending training status and trainee information including, training completion results, student/instructor comments, certifications to trainees and third parties such as training/regulatory authorities and employers.

It is another aspect of the present invention to provide methods and systems for certifying training as successfully being completed through a hand held device by sending training completion results to trainees and third parties such as training regulatory authorities and employers via electronic means which can include e-mail receipt.

It is another aspect of the present invention to provide methods and systems for automatic generation of paper-based communication (e.g., letter/certificate) for completed training, which can be provided to trainees and third parties associated with trainees.

It is another aspect of the present invention to provide methods and systems for certifying training as successfully completed by a user through a hand held device by sending training completion results to the user through the hand held device.

It is another aspect of the present invention to provide methods and systems for certifying training as successfully being completed through a hand held device by sending training completion results to the hand held device user via electronic means that can include e-mail receipt, and automatic generation of paper-based communication (e.g., letter/certificate).

It is another aspect of the present invention to provide methods and systems for providing continuing legal education instruction through electronic networks to wireless hand held devices and their respective users.

The above and other aspects of the invention are achieved as will now be further described.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 13 illustrates screen shots that are representative of multimedia content that can be associated with methods for carrying of the present invention;

FIG. 14A illustrates screen shots that are representative of multimedia content that can be associated with methods for carrying of the present invention;

FIG. 18 illustrates screen shots that are representative of multimedia content that can be associated with methods for carrying of the present invention;

FIG. 19 illustrates screen shots that are representative of multimedia content that can be associated with methods for carrying of the present invention;

FIG. 20 illustrates screen shots that are representative of multimedia content that can be associated with methods for carrying of the present invention;

FIG. 26 illustrates screen shots that are representative of multimedia content that can be associated with methods for carrying of the present invention;

FIG. 27 illustrates screen shots that are representative of multimedia content that can be associated with methods for carrying of the present invention;

FIG. 30 illustrates screen shots that are representative of multimedia content that can be associated with methods for carrying of the present invention;

FIG. 31 illustrates screen shots that are representative of multimedia content that can be associated with methods for carrying of the present invention;

FIG. 32 illustrates screen shots that are representative of multimedia content that can be associated with methods for carrying of the present invention;

FIG. 35 illustrates screen shots that are representative of multimedia content that is associated with a method and system for carrying of the present invention; and FIG. 36 illustrates screen shots that are representative of multimedia content that is associated with a method and system for carrying of the present invention.

DETAILED DESCRIPTION OF PREFERRED EMBODIMENTS

The following description is presented to enable persons skilled in the art to make and use the invention, and is provided in the context of particular applications and its requirements. Various modifications to the disclosed embodiments will be readily apparent to those skilled in the art, and the general principles defined herein may be applied to other embodiments and applications without departing from the spirit and scope of the present invention.

Thus, the present invention is not intended to be limited to the embodiments shown, but is to be accorded the widest scope consistent with principles and features disclosed herein. Although preferred embodiments of the present invention are described herein, those skilled in the art can appreciate that a number of varying embodiments may be implemented in accordance with the present invention.

Training Systems

Figure 1:
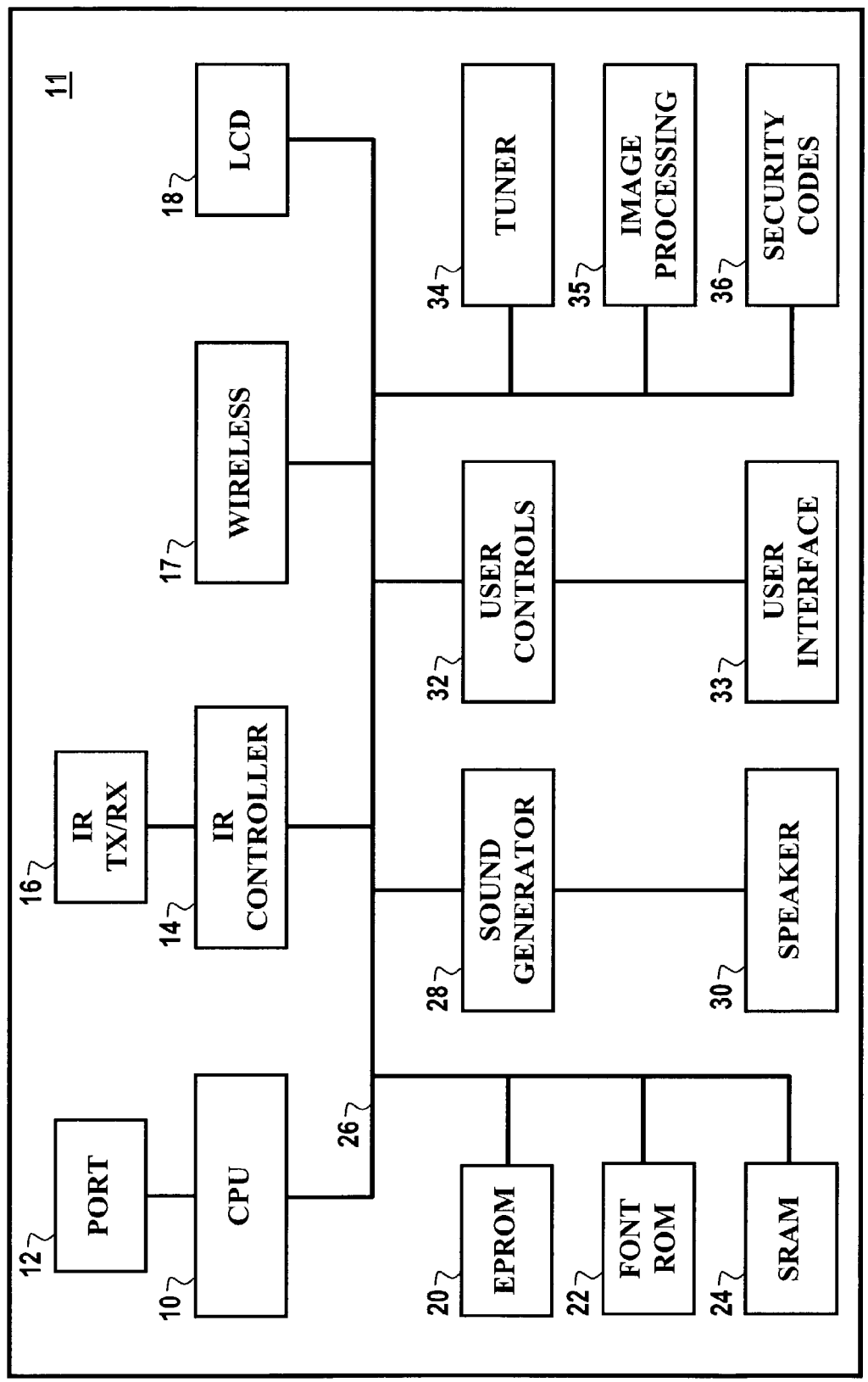
FIG. 1 depicts a block diagram illustrating components of a hand held device in which embodiments of the present invention may be implemented.

In accordance with aspects of the present invention, new methods and systems for providing training through/over networks to remote computer/handheld device users will now be described in detail. Training can be provided through networks to computers and hand held devices. Handheld devices can include PDAs, pagers, and wireless phones. Referring to FIG. 1, a schematic diagram illustrating a general hardware configuration of a hand held device 11 in accordance with an embodiment of the present invention is provided. Those skilled in the art can appreciate, however, that other hardware configurations with less or more hardware and/or modules may be utilized in carrying out the methods and systems of the present invention as will be further described herein. Those skilled in the art can also appreciate that many components found in handheld computing devices are also commonly found in desktop computing systems, therefore desktop computing system should be considered to be adequately disclosed if associated with any aspect of the present invention related to wired communication and/or electronic networks.

CPU 10 of hand held device 11 performs as a main controller operating under the control of a CPU 10. CPU 10 may be configured, for example, as at least a 16-bit microprocessor. External pins of CPU 10 are generally coupled to at least one internal bus 26 so that it may be interconnected to respective components. A SRAM 24 can be configured as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., font) displayable on a display 18. Examples of types of displays that may be utilized in accordance with display 18 include a TFT active matrix display, an illuminated LCD (Liquid Crystal Display), or other small-scale displays being developed.

CPU 10 of the preferred embodiment drives a display 18, and can utilize, among other media, font images from Font ROM 22, and images transmitted as data through wireless unit 17 and processed by image-processing module 35. An EPROM 20 can be configured as a read only memory that is generally erasable under certain conditions and can be utilized for permanently storing control codes for operating respective hardware components and security data, such as a serial number.

Figure 3:
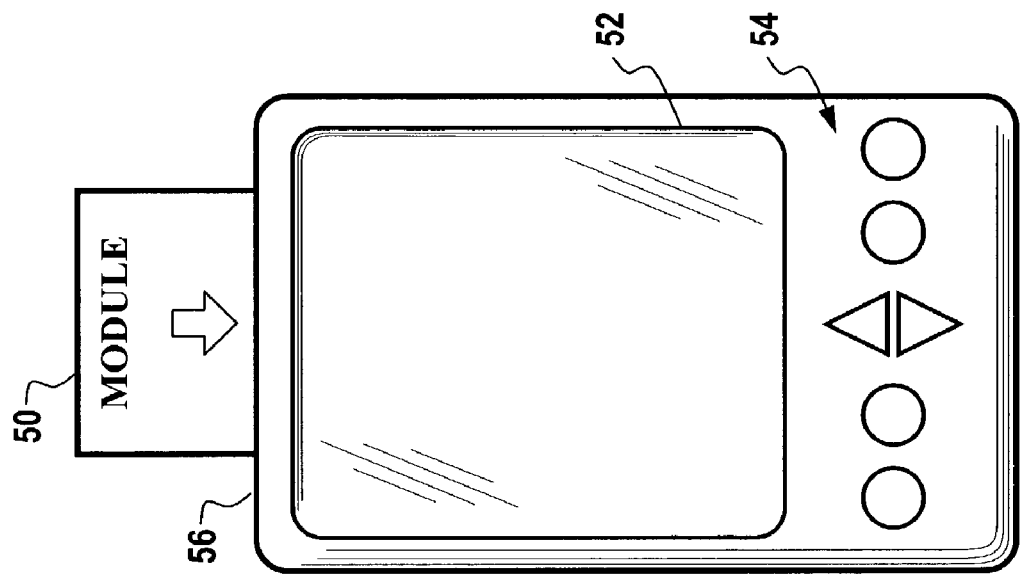
FIG. 3 depicts a pictorial representation of a hand held device adapted for receiving a module in accordance with embodiments of the present invention.

An IR controller 14 can be provided with hand held device 11 and configured as a dedicated controller for processing infrared codes transmitted/received by an IR transceiver 16 and for capturing the same as computer data. Alternatively or additionally, wireless unit 17 can generally be configured as a dedicated controller and transceiver for processing wireless data transmitted from and to a wireless remote radio frequency communications network. Note that wireless unit 17 can be implemented as a separate module or cartridge, such as illustrated in FIG. 3. Wireless unit 17 can thus also b referred to in the art as a wireless "module" or "cartridge."

Port 12 can be connected to CPU 10 and can be temporarily attached, for example, to a docking station to transmit information to and from hand held device 11 to other devices such as personal computers or electronic kiosk devices, and so forth, and can be used in order to download training course material. Port 12 can also be configured, for example, to link with a modem, cradle or docking station, well known in the art to permit network devices, personal computers or other computing devices to communicate with a hand held device 11.

User controls 32 permit a user to enter data to hand held device 11 and initiate particular processing operations via CPU 10. A user interface 33 may be linked to user controls 32 to permit a user to access and manipulate hand held device 11 for a particular purpose, such as, for example, viewing images on display 18. Those skilled in the art will appreciate that user interface 33 can be implemented as a touch screen user interface, as indicated by the dashed lines linking display 18 with user interface 33. In addition, CPU 10 may cause a sound generator 28 to generate sounds of predetermined frequencies from a speaker 30. Speaker 30 may be utilized to produce music and other audio information associated with video data transmitted to hand held device 11 from a training provider.

Those skilled in the art can appreciate that additional electronic circuits or the like other than, or in addition to, those illustrated in FIG. 1 may be used to construct hand held device 11. Such components, however, are not described in the present specification, because many aspects of them are well known in the art. In addition, those skilled in the art will appreciate that hand held device 11 can be implemented as a specific type of a hand held device, such as a Personal Digital Assistant (PDA), paging device, WAP-enabled mobile phone, and other wireless, data-enabled hand held computing devices well known in the art.

Given the teaching of various embodiments of the present invention, it should be appreciated that a hand held device 11 can be configured to permit images, similar to television broadcast images, to be displayed on display 18 for a user to view. Hand held device 35 thus includes an image-processing unit 35 for processing images transmitted as data to hand held device 11 through wireless unit 17. A tuner unit 34, implemented as either a single tuner or a plurality of tuners, may be linked through internal bus 26 to CPU 10. Additionally, a security unit 36 may be utilized to process proper security codes to thereby ensure that data transferred to and from hand held device 11 may be secure and/or permitted.

Security unit 36 may be implemented as an optional feature of hand held device 11. Security unit 36 can also be configured with software, e.g., algorithm routines or subroutines, that are processed by CPU 10, and which prevent wireless data from being transmitted/received from hand held device 11 beyond a particular frequency range, outside of a particular geographical area associated with a local wireless network, or absent authorization codes or unique signatures (e.g., decryption, encryption, coding, decoding, biometrics and so forth). Note that security unit 36 can be implemented as a separate security module, such as, for example, a smart card, or cartridge. An example of a module, which may be implemented in accordance with the methods and systems of the present invention, is illustrated in FIG. 3. A security module of this type may be utilized for securing data transmitted from or to a hand held device such as, for example, hand held device 11.

Hand held device 11 can thus be configured with both wireless and wireline capabilities, depending on the needs and requirements of a manufacturer or customer. Such wireless capabilities include features such as those found in cellular telephone units, in accordance with carrying out embodiments of the present invention. Current examples of hand held devices that can be utilized in accordance with the methods and systems of the present invention include the "PalmPilot™" PDA, manufactured and sold by Palm Computing, the Handspring Visor™, Window CE™ compatible devices, RIM™ Blackberry-family paging devices, Motorola paging devices, and the Symbol™ SPT-family of PDA-type organizer devices. Such hand held devices are mentioned herein for illustrative purposes only and are not considered limiting features of the present invention. Hand held devices which may also be implemented in accordance with the methods and systems of the present invention include hand held devices, such as cellular telephones having viewable display screens for the display of data transmitted through wireless connections networks.

Those skilled in the art can appreciate that although hand held device 11 is generally illustrated in FIG. 1, hand held device 11 can be implemented as a wireless application protocol (WAP) web-enabled cellular hand held device, such as a PDA, wireless phone, pager or a combination thereof. Hand held device 11 can also be configured with features of combination cellular telephone/PDA devices. One recent example of such a device is the Handspring™ PDA and associated cellular phone attachment module, which is manufactured and sold by Handspring™ Inc. Other such devices include the Palm-Motorola phone, which permits users to access e-mail and store calendars and contact databases.

Regardless of the type of hand held device implemented, it is anticipated that such hand held devices will be adapted to receive and process data via CPU 10 and image-processing unit 35 for ultimate display as moving images on display unit 18, in accordance with the present invention. Image-processing unit 35 may include image-processing routines, subroutines, software modules, associated protocols (e.g., XML, HTML, XHTML, CSS WAP etc.), and so forth, in support of and/or to perform data-/image-processing operations. Hand held device 11 thus merely represents an exemplary illustration of one possible hand held device that may be implemented in accordance with the methods and systems of the present invention. Such a hand held device may be configured according to a wide variety of configurations. Hand held device 11 is thus not a limiting feature of the present invention. Training can thus be provided in accordance with methods and systems of the present invention through a wireless hand held device, such as hand held device 11.

Figure 2:
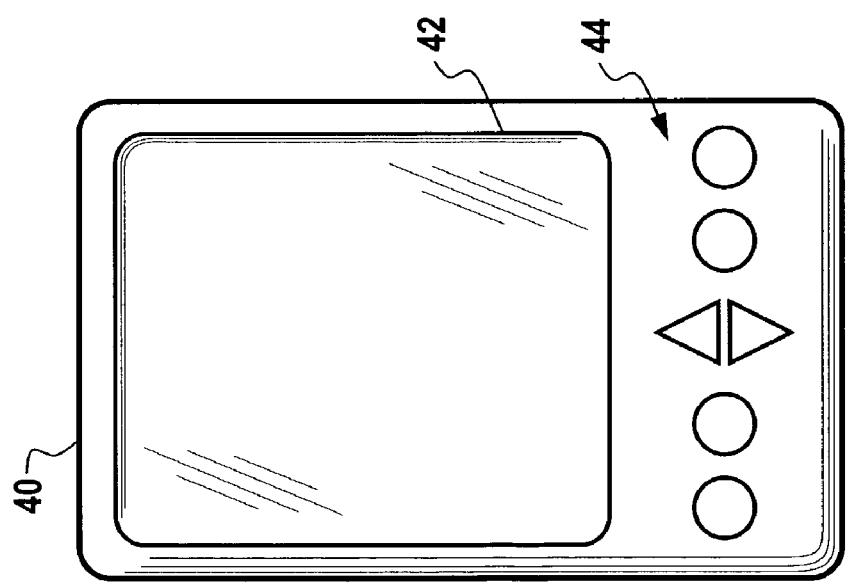
FIG. 2 illustrates a pictorial representation of a hand held device, which may be utilized to implement embodiments of the present invention.

FIG. 2 illustrates a pictorial representation of a hand held device 40 that can be utilized to implement preferred embodiments of the present invention. Hand held device 40 includes a display screen 42, which is generally analogous to display 18 of FIG. 1. Multimedia presentations or digital data may be displayed on display screen 42 for a user to view. User controls 44 can permit a user to select and/or manipulate images or text displayed on display screen 42. User controls 44 of FIG. 2 are generally analogous to user controls 32 of FIG. 1. A touch screen user interface may be further configured on the display screen 42 with hand held device 40 to permit a user to manipulate images/text displayed on display screen 42.

FIG. 3 depicts a pictorial representation of a hand held device 56 adapted for receiving a module 50 (or also "cartridge"), in accordance with preferred embodiments of the present invention. Hand held device 56 of FIG. 3 is generally analogous to hand held device 40 of FIG. 2, the only difference being that hand held device 56 may be adapted to receive a module/cartridge 50 that can permit it to function according to specific hardware, codes, authorizations and/or instructions contained in a memory location (e.g., a computer chip or magnetic strip) within the module 50. Module 50 can be configured as a smart card, well known in the art. Note that as utilized herein, the term "module" may refer to a physical module, such as a cartridge. The term "module" may also refer to a software module composed of routines or subroutines that perform a particular function. Those skilled in the art can appreciate the meaning of the term module is based on the context in which the term is utilized and environment being described. Thus, module 50 as illustrated can be generally configured as a physical cartridge or smart card. The term "module" as utilized herein may also refer to a software module, depending on the context of the discussion thereof.

To illustrate the use of a physical module, such as module 50, assume that a user may possess several such physical modules or cartridges. One module, when inserted into hand held device FIG. 3 can instruct hand held device 50 to function as a standard PDA, such as a handspring Visor™ device. Another module, when inserted into hand held device FIG. 3, may instruct hand held device 56 to function as a wireless hand held device for receiving and implementing training for a user through the wireless hand held device.

Those skilled in the art can thus appreciate that hand, held device 56 can be adapted to receive and cooperate with module 50. Additionally, hand held device 56 includes a display screen 52 that is generally analogous to display screen 42 of FIG. 2 and display 18 of FIG. 1. Hand held device 56 also includes user controls 54 that are generally analogous to user controls 44 of FIG. 2 and user controls 32 of FIG. 1. Hand held device 56 of FIG. 3 is generally analogous to hand held device 11 of FIG. 1. Thus, hand held device 56 can also implement touch screen capabilities through a touch screen user interface integrated with display screen 52.

Assuming module 50 is implemented as a smart card instead of a cartridge to provide receiver and/or securing capabilities (e.g., encryption, decryption, coding, decoding, biometric authentication, etc.), it is anticipated that similar features can be implemented in accordance with a smart card to insure that hand held device 56 includes touch screen user interface and video viewing capabilities. Most smart cards are generally known in the art as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards may be generally configured as either a contact or contactless smart card, or a combination thereof. A contact smart card requires insertion into a smart card reader (e.g., contained within hand held device 56) with a direct connection to, for example, a conductive micromodule on the surface of the card. Such a micromodule may be generally gold plated. Transmission of commands, data, and card status takes place through such physical contact points.

A contactless card requires only close proximity to a reader. Both the reader and the card may be implemented with antenna means providing a contactless link that permits the devices to communicate with one another. Contactless cards can also maintain internal chip power or an electromagnetic signal (e.g., RF tagging technology). Two additional categories of smart cards, well known in the art, which are based on contact and contactless cards are the so-called Combi cards and Hybrid cards.

A Hybrid card generally may be equipped with two chips, each with a respective contact and contactless interface. The two chips are not connected, but for many applications, this Hybrid serves the needs of consumers and card issuers. The Combi card may be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Figure 4:
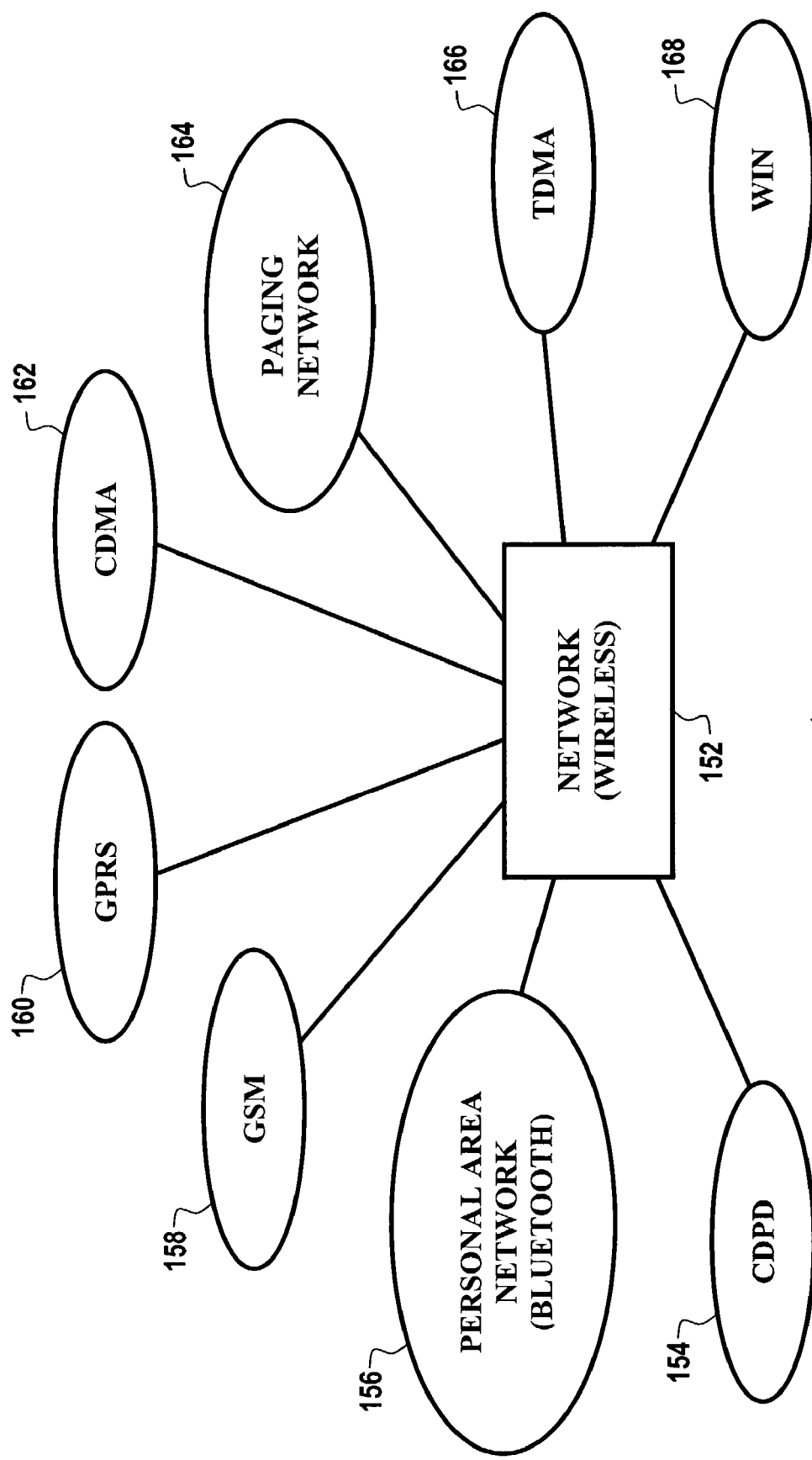
FIG. 4 illustrates a diagram depicting attributes of a wireless network that may be utilized in accordance with embodiments of the present invention.

Educational instruction and training can be received by and for completion at wireless devices through electronic networks, which are generally well known in the art. FIG. 4 illustrates a communication diagram 170 depicting various attributes that can be associated with wireless network 152 communication and that can be utilized in accordance with preferred embodiments of the present invention as applied to handheld devices. A wireless network 152 as illustrated in FIG. 4 can thus be configured as a variety of possible wireless communication systems. Thus, entity diagram 170 illustrates attributes of a wireless network 152, which may or may not be exclusive of one another.

Communication and Data Protocols

Those skilled in the art can appreciate that a variety of possible wireless communications and networking configurations can be utilized to implement a wireless network 152. Wireless network 152 can be, for example, implemented according to a variety of protocols, including TCP/IP, cellular, Bluetooth, and 802.11 RF or direct IR communications. Wireless network 152 can be implemented as a single network type or a network based on a combination of network types (e.g., Internet, PSTN, LAN, WAN, VPN, etc.).

Wireless network 152 may be configured with teachings/aspects of CDPD (Cellular Digital Packet Data) 154 networks well known in the networking arts. CDPD network 154 is illustrated in FIG. 4. CDPD may be configured as a TCP/IP based technology that supports Point-to-Point (PPP) or Serial Line Internet Protocol (SLIP) wireless connections to mobile devices, such as the hand held devices described and illustrated herein. Mobility and/or cellular service are generally available throughout the world from major service providers. Data can be transferred utilizing CDPD protocols.

Current restrictions of CDPD are not meant to limit the range or implementation of the methods and systems described herein, but are described herein for illustrative purposes only. It is anticipated that CDPD will be continually developed, and that such new developments can be implemented in accordance with the present invention.

Wireless network 152 may also be configured with teachings/aspects of a Personal Area Network 156 such as 802.11 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein.

The Bluetooth standard has permitted up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 152 may also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800–1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Wireless network 152 may also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 152 may also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 152 may also be configured with a form of CDMA technology known as wideband CDMA (W-CDMA). Wideband CDMA may be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 152 can also be implemented utilizing teachings/aspects of paging network 164. Such paging networks, well known in the telecommunications arts, can be implemented in accordance with the present invention to enable transmission or receipt of data over the TME/X protocol, also well known in the telecommunications arts. Such a protocol enables notification in messaging and two-way data coverage utilizing satellite technology and a network of base stations geographically located throughout a particular geographical region. Paging network 162 can be configured to process enhanced 2-way messaging applications.

Unified messaging solutions can be utilized in accordance with wireless network 152 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the present invention, but are described herein for illustrative purposes only. It is anticipated that such paging networks, including those based on the TME/X protocol, will be continually developed and that such new developments can be implemented in accordance with the present invention.

Wireless network 152 may also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user may be assigned a specific timeslot for transmission. A digital cellular communications system that utilizes TDMA typically assigns 10 timeslots for each frequency channel.

A hand held device operating in association with a TDMA network sends bursts or packets of information during each timeslot. The receiving equipment into the original voice or data/information components then reassembles such packets of information. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 152 may also be configured utilizing teachings/aspects of Wireless Intelligent Networks (WINs) 168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semipermanent mobile subscriber (wireless device user) information for wireless carriers' entire subscriber base.

A useful aspect of WINs for the present invention is enabling the maintenance and use of customer profiles within an HLR/VLR-type database. HLR subscriber information as used in WINs includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR may also be configured as a database that contains temporary information concerning the mobile subscribers currently located in a given MSC serving area, but whose HLR may be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to effect wireless and wireline call setup, routing, control, services, enhanced features and secure communications.

Improved operating systems and protocols allow Graphical User Interfaces (GUIs) to provide an environment that displays user options (e.g., graphical symbols, icons or photographs) on a wireless device's screen. Extensible Markup Language ("XML") is generally a currently available standard that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML may effectively enable one system to translate what another system sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Figure 5:
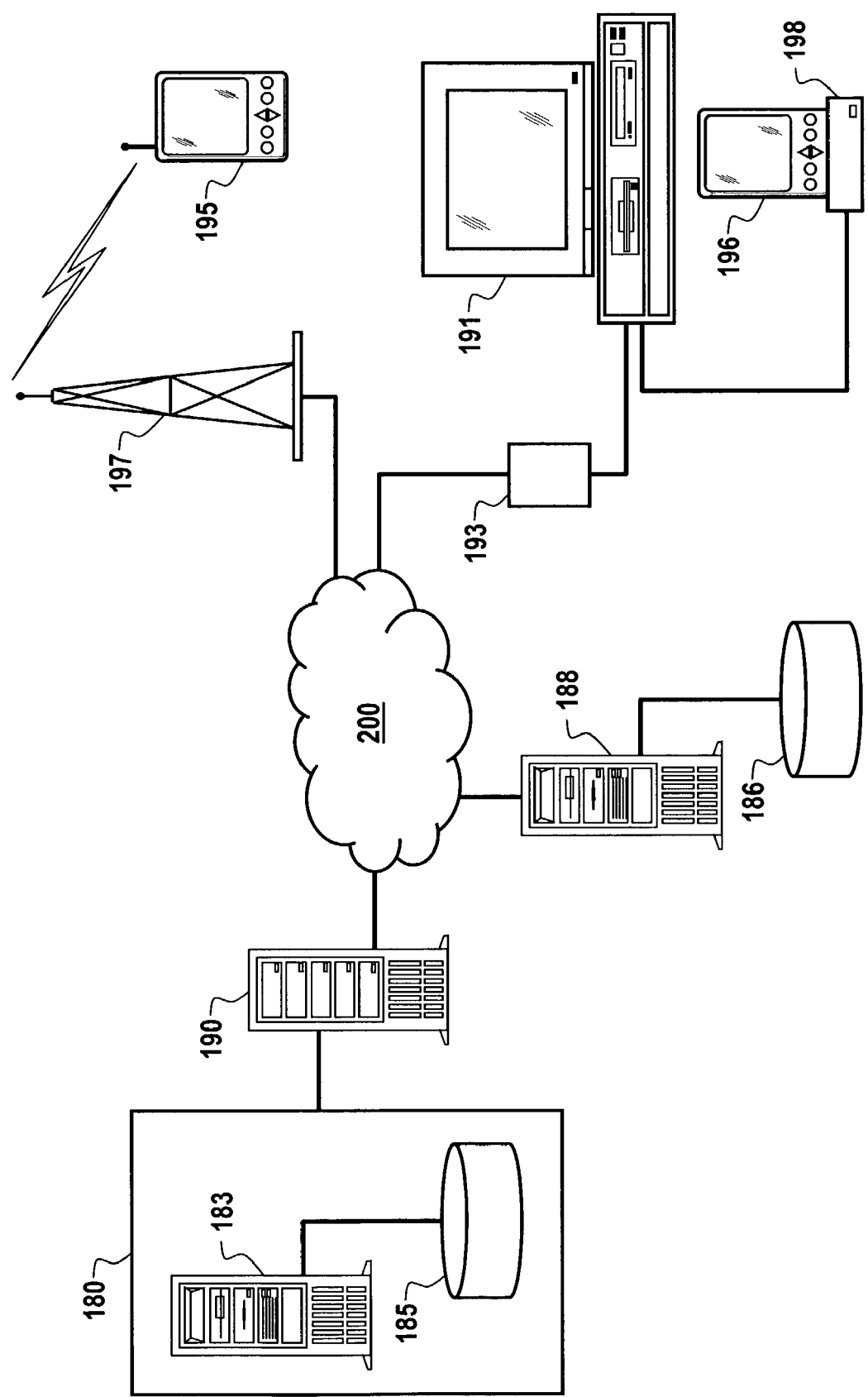
FIG. 5 illustrates communication equipment useful for carrying out network-based training systems and methods in accordance with the present invention.

Referring to FIG. 5, a high-level illustration communication equipment useful for carrying out network-based training systems and methods in accordance with present invention. Enterprise equipment 180 used by the training/education provider can include a server 183 and database 185 that can be connected to a network 200 via network equipment 190 (e.g., routers, modems, switches, etc.). User equipment such as a PC 191 or handheld wireless device 195 can be connected a user to network 200 via, for example, a wired 193 or wireless 197 communication equipment connection (e.g., 802.11, WAP, GSM, PCS, CDMA, GPRS, CDPD, DSL, ISDN, T-1/T-3, satellite, or the like). A handheld device 196 can be connected to, or otherwise access, networks through a PC 191 via a docking station 198. Furthermore, network 200 can provide access to third party training media 186 from information servers/providers 188 accessible through electronic networks (e.g., the Internet).

Server 183 can control access to training resources that are stored within a database 185 and can organize and manage the feedback or information received from the users, to be reported back to the appropriate parties (e.g., supervisors, regulatory entities such a State Bars). A user can utilize a web browser, such as Netscape Navigator™, Microsoft Internet Explorer™, or other web browsers and micro browsers known to those skilled in the art, to access training and associated information. The training and materials can be downloaded through the network 200 to the user's portable equipment in a multimedia form that can include streaming video as well as audio, slide shows and text portions. It is well known that streaming video programs can be utilized as a plug-ins to the web browser to allow viewing of streaming video. Examples of functional streaming video applets include RealPlayer™ provided by RealNetworks, as well as other streaming video products such as Window Media™ Player, provided by Microsoft, Inc. and QuickTime™ Player, provided by Apple Corporation.

With streaming video, training segments can be provided to or otherwise streamed across a communications channel, i.e. the Internet, on demand to end users. Training segments can also be stored on a proxy cache server for non-internet access should the net connection be disconnected as well as to increase bandwidth.

General Training Methods

Figure 6:
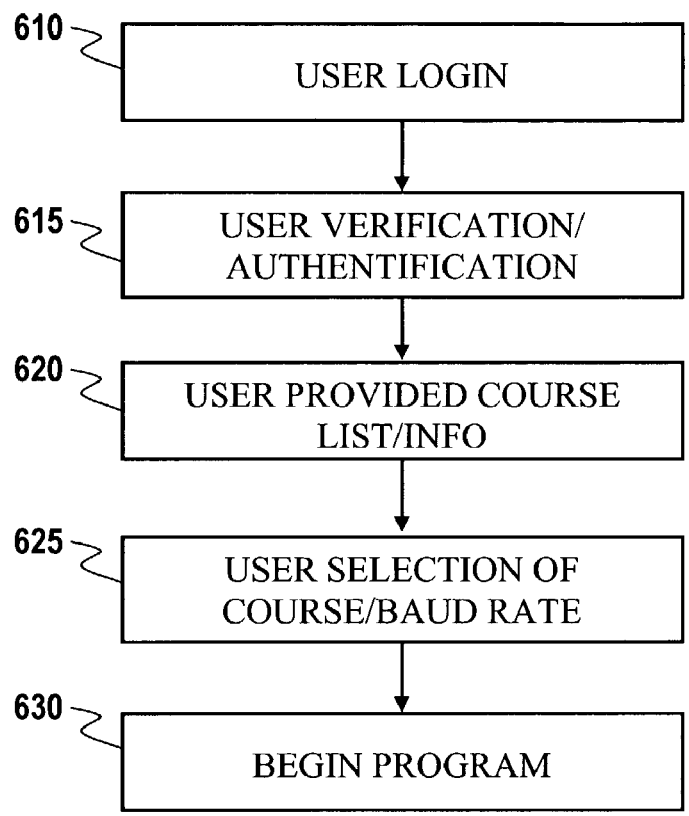
FIG. 6 illustrates a flow chart for a method of granting access to the instructional segments.

FIG. 6 illustrates a block diagram of a flow chart illustrating the method of granting access to training. As shown in block 610, users can gain access to the authorized training programs following a login and password sequence or through biometric authentication means. Methods of granting an authorized supervisor of one or more users access to user(s) records relating to information viewed and accessed by the user(s) are important in order to maintain data and program integrity. Once the training system has the user login to access the system. The login is verified before presenting instructional titles for view as shown in block 615. Once logged on, user is presented with and can choose from several training courses and other related materials as shown in block 620. The user can select a given title with an appropriate communications format (e.g., baud/bit rate) for viewing as shown in block 625, and the program can be downloaded or begin as shown in block 630. Timing of the training program can begin simultaneously with the training programs downloaded or stream (when streaming is involved).

A login procedure is generally provided for the user where the user is asked to enter a password, login handle, biometric sample, or any combination of verification/authentication data. GUI representations of login screens and password fields are well known in the art. The user generally clicks on the SUBMIT button after filling in their information and the information is submitted to the server. The users equipment and the server performs a handshake operation to verify the access rights of the user based on the appropriate information provided by the user.

The server can grant a user access to training through a title page (typically in HTML format) that can allow the user to select among the instructional segments or courses provided for use. Other optional features that can be provided to users include joining a chat discussion on the subject matter of a given course as well as providing a threaded discussion group for review and correspondence among fellow users.

The course titles or options shown on device screens may be accessed or activated by highlighting the desired section with the cursor and/or clicking on underlined (e.g., HTML) lettering with cursor manipulation device, typically a mouse or a touch screen tap. Active titles can be hyperlinks to licensed media, such as a video segment. Unlicensed, or public, media can also be shown, either as hypertext or as plain text. Further, the user can be shown the length of time required to view each course or segment as well as whether the user has viewed the course or segment and whether the course or segment has been completed, which includes the evaluation or testing portion following the completion of viewing the segment.

As described above, a user can select a course along with parameters that define the course by selecting a title, and can also select a communications means (e.g., streaming bit rate) for the program when applicable. For example, streaming bit rates depend upon the communications connection between the user and server. The user can inform the server what type of connection the user has and the server then optimizes the transfer of data based on the actual transfer rate established between the user and server. Of course the transfer rates can also be determined automatically during the connection protocol sequence used by the server and user's computer. Upon selection of a desired title, database/server begins transmitting information over the communications channel to the end user at an optimal or selected transfer rate.

Figure 7:
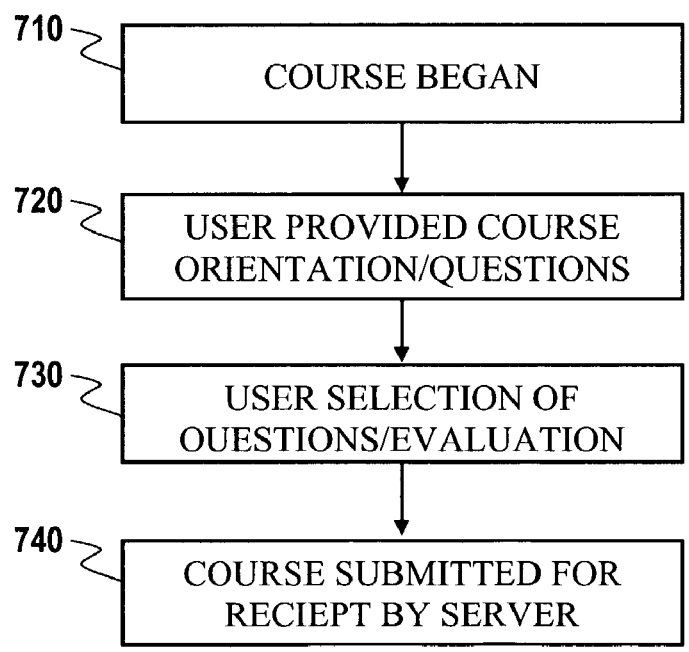
FIG. 7 illustrates a flow chart of training sequences using a handheld device in accordance with methods of the present invention.

The invention will now be described with the continuation from where the user accesses the initial presentation screen. FIG. 7 illustrates a block diagram of a flow chart illustrating training sequences using a handheld device. A user can makes a training selection upon verification of the user by the system, as shown in FIG. 6. It can be assumed that the course has been successfully transferred to the device, or that an active communication channel has been set up. The course can begin, as shown at block 710. Prior to the commencement of the instructional material, preliminary questions or content points (orientation) for the user to review can be provided 720. This makes the user aware of what to observe during the presentation of the program. Additionally, the user can be given the option to print questions or points for review and awareness during the instruction portion of the presentation.

The handheld system can present questions and content points to the user at the beginning as well as during a course. The system (or test software) can also require a post test and final information from the user before course completion. Questions and content can be provided as an interactive session, or can be conducted with the handheld device computing assets alone. Once the end of a course is reached, the user can review the material and complete post test questions, which may be in essay or multiple-choice format, or a combination of the two. The questions are then submitted for evaluation as shown in block 730. The information is received by the server 740 and saved for further use and/or evaluation.

Training sessions are accessible by more than one user as shown in FIG. 6. More than one instructional leader or administrator can also access administrative sections of the enterprise system, after logging into the system. Administrators can use reports after performing a login and verification similar to that taught in FIG. 6, for access by trainees. The administrator can select reporting/certification or administrative sections of the system, based on authorization level. Reporting and certification selections can allow for access and control to test records and course completion certificates associated with users/trainees. The administrative section can allow for the manipulation (addition or subtraction) of training material and/or accounting records. After making a selection, a data summary is provided for a user's within the selected group. Assuming, for example, that an administrator selects one of the user's files for review of the user's exam. The administrator can provide feedback to the user and/or verify the user's completion of the selected instructional segment.

Figure 8:
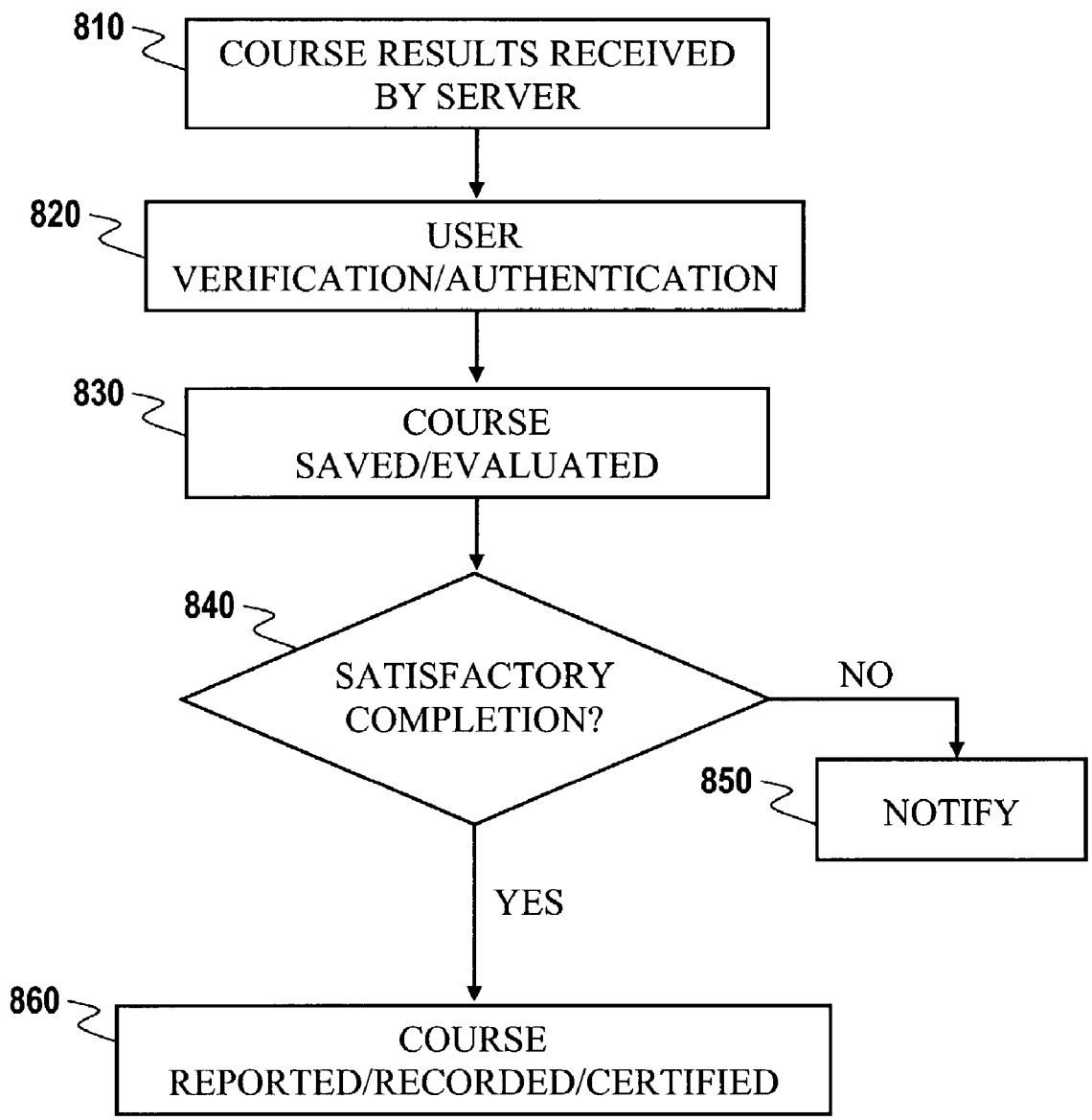
FIG. 8 illustrates reporting and certifying methods in accordance with the present invention.

Referring to FIG. 8, illustrated is a flow diagram for reporting and certifying methods in accordance with the present invention. Completed courses and information related to training or the user can be received from a user via networks, as shown in block 810. The user can be authenticated prior to further processing of received information as shown in block 820. Once information is received, it can be saved and/or evaluated as shown in block 830 The server can automatically determine as shown in decision block 840, whether the course is satisfactorily completed or not. If not, the user can be notified as shown in block 850. Of course it should be appreciated that other parties associated with the user can also be notified if relevant (e.g., an employer). If the course was satisfactorily completed, the user's results can be certified, reported or otherwise recorded as shown in block 860. Reporting can be generated in the form of emails sent to trainees and associated third parties (e.g., employers) regarding, for example, the trainees scores, class standing, completion status, etc. Reporting can include, for example, notifying the trainee of his or her results or that the user must review the material and complete the associated exam. An administrator can also use the system to assist in the remote evaluation of a user's understanding of the viewed materials, and to provide a report/information back to the user's or the user's supervisors in accordance with the principles of the present invention. It should also be appreciated that the system can be programmed to automatically score, track, report, and certify user activities. Certification and reporting can be directly to a user via email and/or to a user's supervisor, company, and/or regulatory/governing body (e.g., state bars or medical boards).

Multimedia

Figure 9:
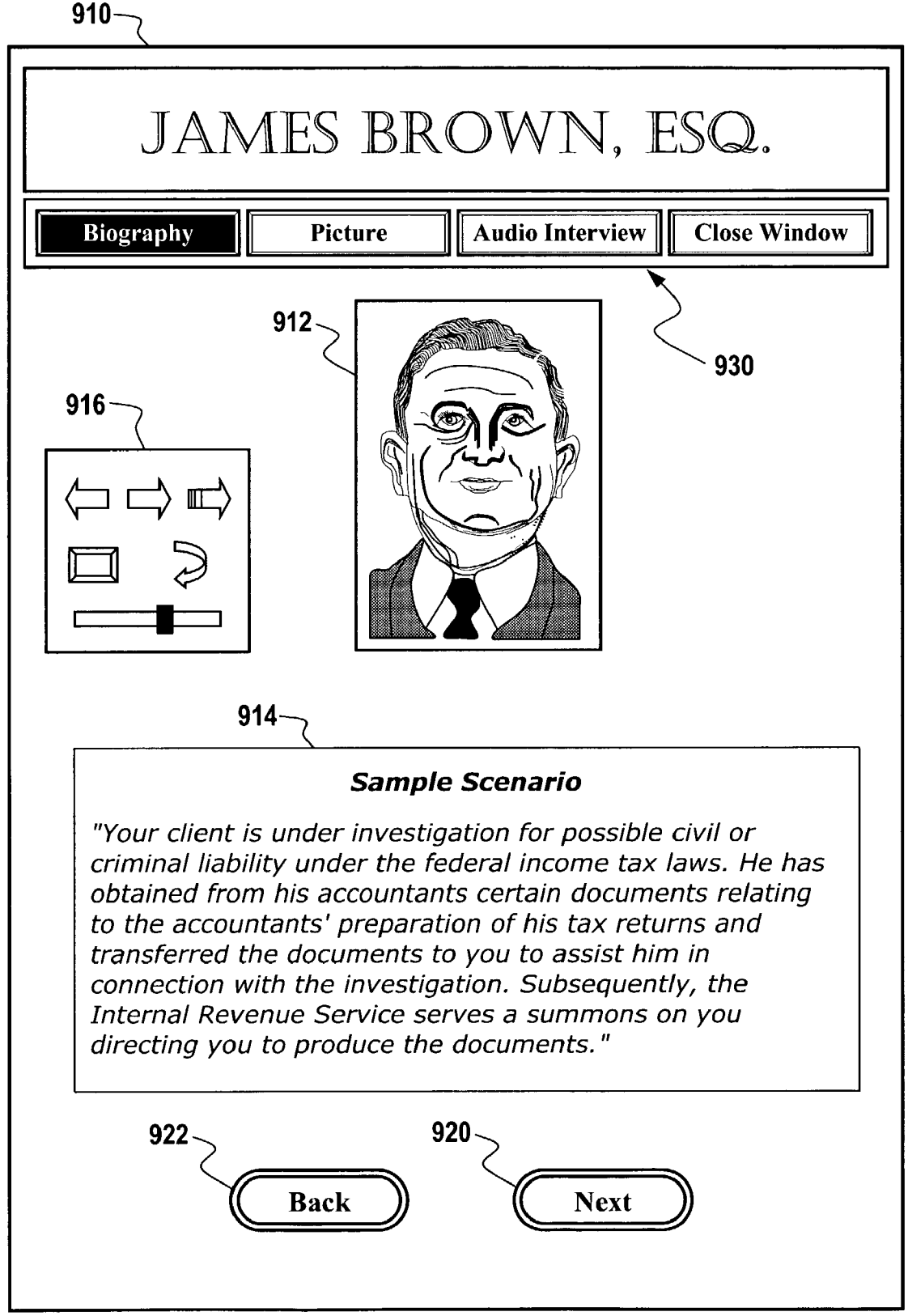
FIG. 9 illustrate a sample image of a segment screen that includes a video window, where video is streamed for the user's review, as well as slide window, where text or still images are presented to the user.

Referring to FIG. 9, an illustration of an example image (e.g., screen shot) of a segment screen 910 that can be displayed on hand held devices. The screen shot includes a video window 912, where video can be streamed for the user's review, as well as slide window 914 where text or still images can be presented to a user. A server 183 can stream training programs and information from databases 185 to the end user 191, 195, 196, as shown in block FIG. 5, where it can be displayed to the user in a format similar to that is illustrated in FIG. 9. Still images such as the text box 914 can be provided in coordination with the streaming video portion 912 of the instructional segment. The still images can be displayed in window 914 along side streaming video shown in window 912, using timing codes. Video controls 916 can allow the user to replay portions of the video, backtrack, pause, stop, or skip ahead as well as control the volume as needed. The timing of the video can be based on the URLs of the slides that are played, which can merely be one example of the timing that may be used. Another method to provide timing can be to cue the slides to the video, or even to be provided independently so the teacher or user can select the next slide when ready. Other navigational bars can allow a user to proceed to the NEXT screen 920 or go BACK 922 to the previous content/screen. Additional information regarding the displayed material, the example given being information on a particular professor, can be provided to the user 930 after his/her selection 920 (e.g., selection via displayed hypertext associated with the selection using a user interface). The text and graphics of this example are otherwise self-explanatory.

Still images are an option that can supplement a training session or discussion as well as streaming video by highlighting important points in the instructional segment. Such points can include dates of interests, formulas relevant to the discussion, illustrative graphics, or lists of related matters for expanding understanding of a given subject, rules of law, medical principles and other supporting examples. Thus, after selecting a title, the instructional segment streams across the communications channel from the server to the user's computer. As the program begins to stream, a slide presentation can also be presented, which can be linked to the synchronized time code of the program and video. Instructions can also be provided to the user prior to the beginning of the video. The segment can contain questions that are presented at the end of the program, as well as questions that are featured at the beginning or during a training session in order to stimulate the viewer to be aware of specific strategies, theories, and applications. It should be appreciated that all instruction and supporting material can be provided in the form of a compressed data filed to the hand held device, rather than as streaming data segments requiring an active connection to a remote server. Such self-contained instruction delivery and use is generally only limited by the amount of memory available at the hand held device. Improvements in the hand held device and wireless communication fields should be anticipated, and will continue to enhance remote training systems and methods—in particular those where hand held devices are used.

Recording/Certifying/Reporting

As mentioned above, methods and systems for certifying successful instruction and training completed through a hand held device can be carried out by sending course/training completion results to training authorities and/or course participants. Certification can be provided via electronic means that can include e-mail receipt and/or automatic generation of paper-based communication (e.g., letter/certificate). Administrative reports can be generated based upon a user's accessing the instructional segments in accordance with the present invention. Reports can be used to provide feedback to instructional leaders or administrators that, in an example of a teacher participating in a teacher development and enhancement program, includes the identity of the faculty member accessing the interactive training segment module, the duration of each faculty members time on line, and the results of the comprehension test/activity at the end of each segment or module. The information can further include access dates and times, IP addresses of devices used by trainees, assignment completion, status and exam/assignment verification. Administrators at all levels can use this data to verify, evaluate, and enhance staff development throughout their organizations. For example, in the case where a teacher is providing instructional materials on-line for students, the teacher can receive evaluation reports that can include useful evaluation information. For example, a teacher would eventually like to know how long each student spent on-line viewing the instructional material and how long each individual student took to answer the comprehension exam at the end of the segment. This would allow the teacher to gauge which subjects and concepts the class as a whole is struggling with as well as what subjects each student comprehends or information can allow a teacher to customize feed back to students, which can help students understand instructional content lecture materials for subsequent material that may follow.

The feedback of the evaluation of the user's performance in answering the questions can be given via a direct email to a valid email addressed provided by the user or posted back to the user's personal access point entered via the password and login portion of the site. Of course, the results can be printed and mailed to the user as an option to provide the user with a validated hard copy. Once an instructional segment is completed, the user can be allowed to select another title to review or elect to log out of the system, thereby completing the instructional session. Furthermore, if a user fails to undertake training in a timely manner, reminders can be sent to the user via email, voice messaging, or a letter, to remind the user to complete the programs within the allotted time prescribed.

Security and Authentication

Figure 10:
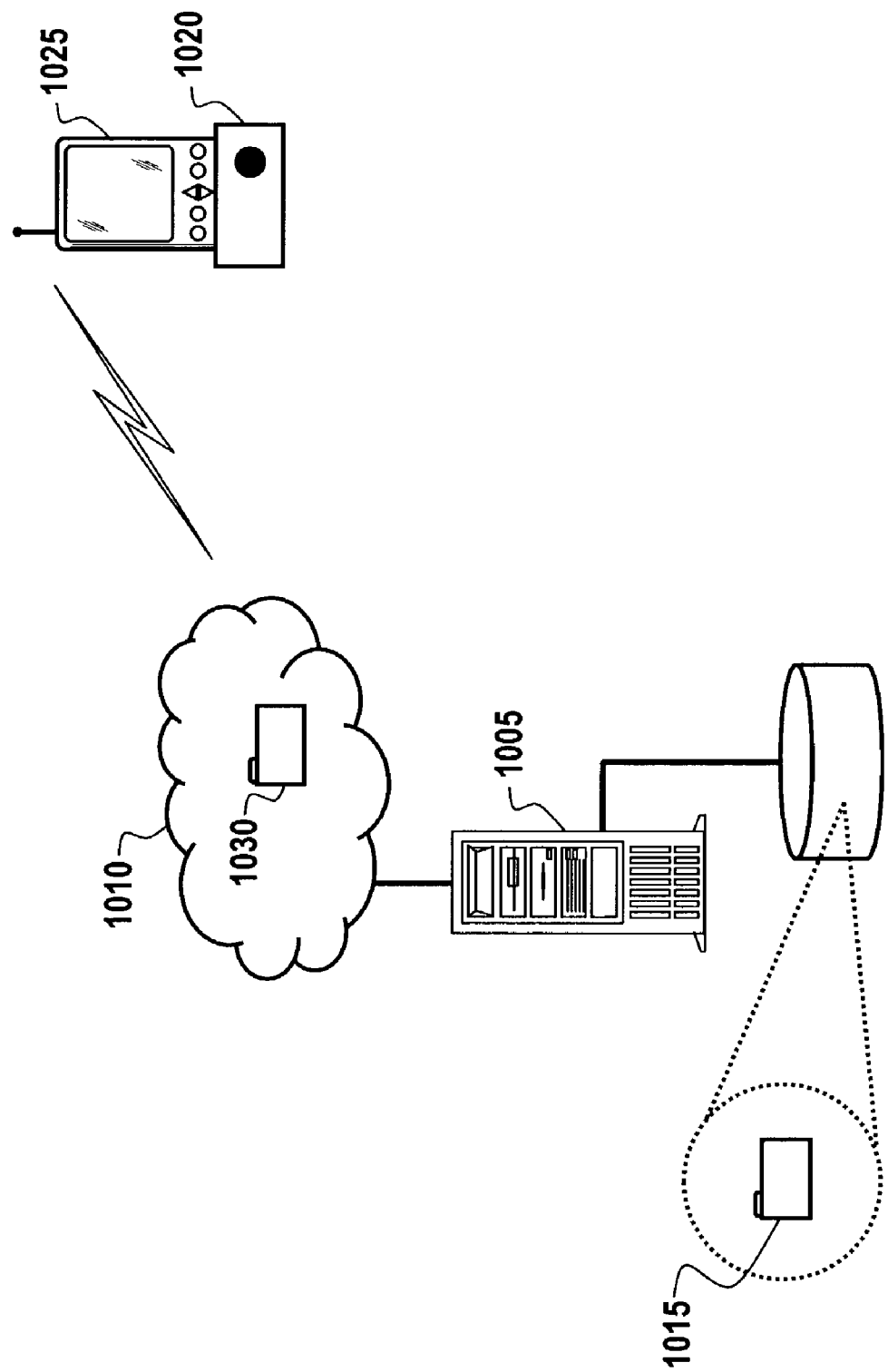
FIG. 10 illustrates systems for authenticating training service users over networks.

Referring to FIG. 10, a system for authentication of a trainee is illustrated. A training Provider that can identify and/or authenticate authorized users of: access to provider systems; access to ongoing training; and the provision of completed training. Authorized users gain access to the system via a hand held device 1025, and data is transmitted and received at the server 1005 through an electronic network 1010. Authentication of training can be by username and password procedures known in the art. Training/trainee authentication can also be by use of biometric authentication means, such as a digital file 1030 taken at the handheld device 1025 via a biometric measuring device 1020 (e.g., fingerprint reader). With biometrics systems, a digital file 1030 representing the user biometric can be matched with a biometric template file 1015 stored at, or accessible by, the server 1005. If the files match, the user is authenticated. Authentication can be used for authorizing all transactions, such as course ordering, and completed course submission.

A biometric identification mechanism 1020 eliminates the weakest link caused by the human factor. Biometric identification mechanisms, or biometric devices, utilize a scientific technique to identify a user based on compared measurements of unique personal characteristics. Biometric identification mechanisms include two basic categories of biometric measurements. The first category involves measuring a unique characteristic found on a user's body. This may include, but is not limited to, finger and hand geometry, retina and facial images, weight, DNA data and breath. The second category involves measuring a user's behavioral characteristics. This may include, but is not limited to, voice, typing stroke and signature. In general, anything that can be measured on a user that is unique can be used as a biometric measurement.

While anything that can be measured on a user that is unique can be used as a biometric measurement, the best biometric measurements to use for authentication purposes depend on the consistency over time of the biometric measured. For example, user weight is a biometric measurement. Because weight is a biometric measurement that fluctuates frequently for many people, it is not a desirable biometric measurement to use for authentication purposes.

The general process of using biometric identification mechanisms as an authentication mechanism is as follows. The user is prompted for a particular biometric measurement that is used by a biometric device to generate a value. The value gets stored in a template as stored biometric data. When the user wants to gain access to a resource that is protected by the biometric device, the user is prompted for live biometric data. The live biometric data is matched with the stored biometric data. In reality, the live biometric data and the stored biometric data will never be exactly the same. Therefore, a user must come within some tolerance to pass the biometric device and gain access to the protected resources. As mentioned above, the biometric device utilizes a scientific technique to identify a user based on biometric measurements. The tolerance is typically predetermined by the vendor for the particular biometric device used.

A specific example of how biometric identification works can be illustrated by a typical fingerprint device. A fingerprint device measures the geometry of a fingerprint. First, a user is prompted for multiple samples of a fingerprint. For each sample, a number of characteristics or measurements are identified. Then, for all of the multiple samples, a number of common characteristics or measurements are identified. The common characteristics or measurements are processed through a unique algorithm that generates a unique template to store the biometric data. When a "live" fingerprint is presented for identification, it is processed through the same algorithm. If the output from the "live" process matches the stored biometric data within a certain tolerance, the user is considered to be authenticated and gains access to whichever resource the fingerprint device is protecting.

A specific example of how biometric identification works when behavioral measurements are involved can be illustrated by a typical signature device. Here, a user is prompted for multiple samples of a signature. For each sample, characteristics or measurements are identified. The characteristics or measurements include the pressure, sequence of events, direction, relative vectors and speed. One example of the sequence of events is to identify that when the user signed his or her signature, that "t" was crossed before "I" dotted. An example of direction is that the user crossed a "t" from right to left. Relative vectors may include the information that "F" is 2.1 the height of "e." Finally, speed recorded is the time it took the user to sign a signature from start to finish.

As with fingerprint devices, common characteristics or measurements are identified for the multiple samples. These common characteristics or measurements are processed through a unique algorithm that generates a unique template to store the biometric data. When a "live" signature is presented for identification, it is processed through the algorithm. If the output from the "live" process matches the stored biometric data within a certain predetermined tolerance, the user is considered to be authenticated.

The use of biometric identification mechanisms as a means for authentication eliminates the forgetful user or unauthorized user access problems can occur through the use of passwords, tokens or smart cards. Because biometric measurements involve either a unique characteristic found on a user's body (e.g., fingerprint) or a user's behavioral characteristics (e.g., signature), it is impossible for users to forget or lose the mechanism of authenticating themselves. Now, it is impossible for User B to "steal" the mechanism of authenticating User A to the enterprise. Likewise, the practices of users sharing passwords and "buddy punching" are eliminated.

While the use of biometric devices can conclusively authenticate a user, the inventor of the present invention recognize that methods and systems are needed that utilizes biometric devices to provide effective authentication to training and education organizations engaged in training over a networked environment while not decreasing the productivity a network provides to service providers (enterprise) and customers (end users/trainees).

Referring to FIG. 10, the present invention overcomes limitations that are typically encountered in online/remote training systems. With the present invention, user authentication protection is used in a networked training environment. The present invention can allow for the following benefits: (1) flexibility to use the right biometric measurement for a training environment; (2) allows trainee/user mobility; (3) flexibility in the degree of authentication required to protect the integrity of educational/training resources; (4) allows remote enrollment of trainees/users; (5) allows remote refreshing of trainee/user biometric templates; and (6) ensures the integrity of training materials (e.g., courses) and test results submitted for courses taken by trainees using remote computers over communication networks.

Training Multimedia Example

Continuing Legal Education (CLE) has been successfully provided to legal professional using wired network communication over the Internet. LawyersLearn.com Inc. (www.lawyerslearn.com) has provided CLE to attorneys nationwide via website connections. The present inventor has described systems and methods for providing/executing training to/over/form hand held devices. The following training multimedia is now described as an example of material that can be provided as training media for viewing and use over hand held devices in accordance with preferred embodiments of the present invention.

Figure 11:
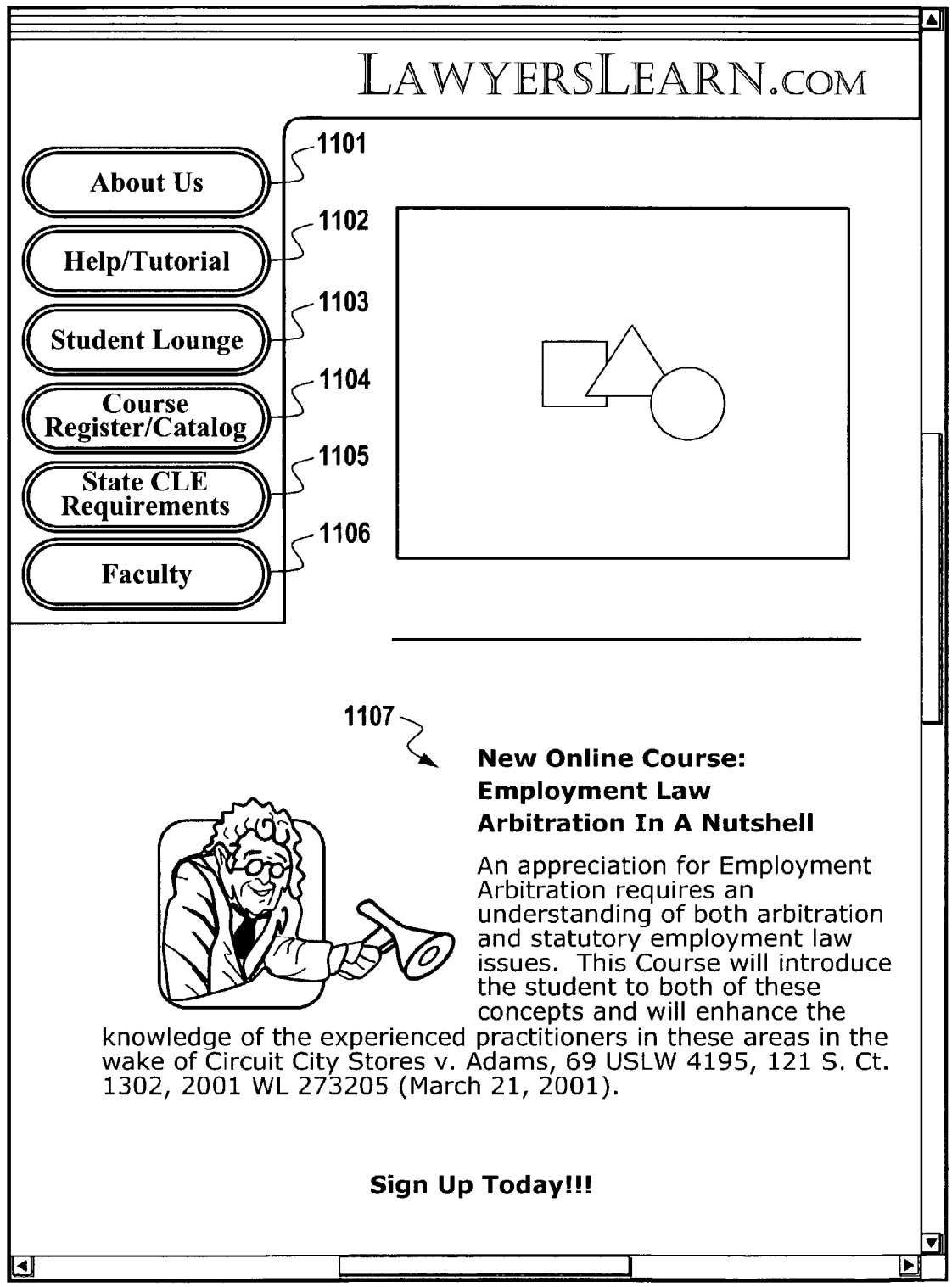
FIG. 11 illustrates screen shots that are representative of multimedia content that can be associated with methods for carrying of the present invention.

Referring to FIG. 11, the homepage of LawyersLearn.com is illustrated. As can be seen from the homepage, a user is immediately introduced to new course offerings with an introductory message 1107 (e.g., "New online Course:"). The user also has the ability to choose from six categories on the homepage: About user 1101, Help/Tutorial 1102, Student lounge 1103, Course Catalog 1104, State CLE requirements 1105 and Faculty 1106. The State CLE Requirements 1105 tab can provide a summary of Minimum continuing legal education (MCLE) requirements for all fifty states and Territories of the United States.

Figure 12:
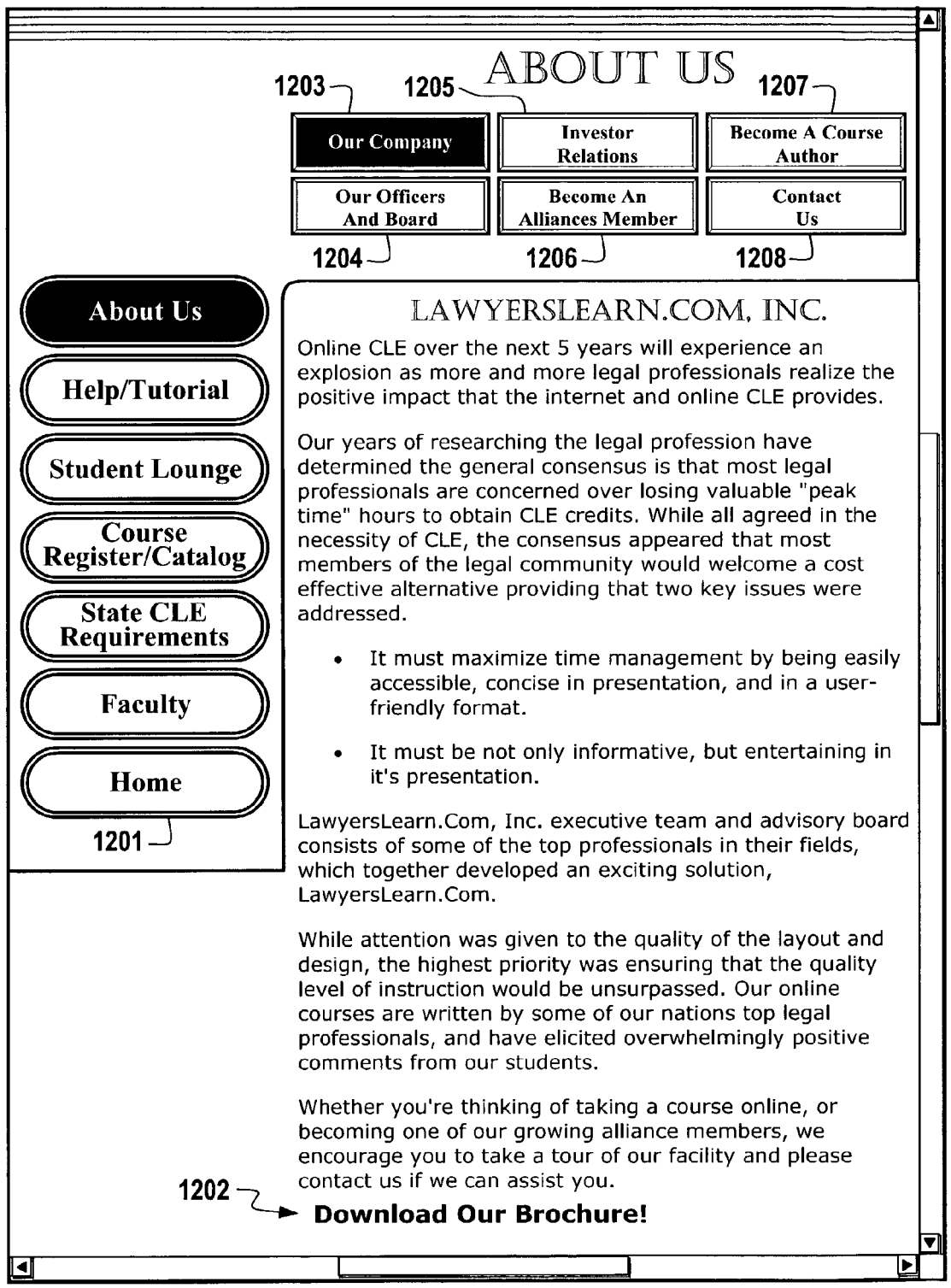
FIG. 12 illustrates screen shots that are representative of multimedia content that can be associated with methods for carrying of the present invention.

Referring to FIG. 12, the About Us 1101 tab of FIG. 11 takes the user to the illustrated page. An additional tab option, Home 1201, can be provided on this and subsequent pages to get the user back to the LawyersLearn.com homepage (FIG. 11). On this page, LawyersLearn.com Inc. is described to new and returning users. The user is also extended the option of downloading a detailed brochure 1202 on items such as company history, services, membership requirement, etc. Also provided as button options to the user are: "Our Company" 1203, "Our Officers & board" 1204; "Investor Relations:"1205; "Become an alliance Member" 1206; "Become a Course Author" 1207; and Contact Us" 1208.

Tab 1206 (become an alliance member) can explore how State Bars and other legal associations can participate in promoting CLE to their constituents and in turn receive a share of profits derived from their membership. Referring to FIG. 13, information on the Alliance Member program is provided. Technically, the LawyersLearn.com information technology infrastructure can keep track electronically of courses purchased by alliance membership in order to determine any fee sharing arrangement. The LawyersLearn.com system can also set up a unique web page for alliance members that operates to promote the alliance member organization on the from end (user or client perspective) but is managed electronically at the backend through the LawyersLearn.com system. For Example, LawyersLearn.com can set up a website that appears to be the general website or CLE portion of the "State Bar of State X", but all transactions related to training are managed and accounted for by LawyersLearn.com's enterprise system.

Referring again to FIG. 12, Tab 1207 (become a course author) provides information to legal professional on how to author course on subject matter for provision to Lawyers-Learn.com users. The information in Tab 1207 explains that a course can be submitted and, if approved, may be provided through the LawyersLearn.com website to participating users. A percentage of fees generated from sales of the author's course can be paid as a royalty to the author.

Referring to FIG. 14A, the "Help/Tutorial" page (Tab 1101, FIG. 11) of the LawyersLearn.com website is shown. The user is able to select HTML portions of this web page: "Let's Begin!" 1401; "your Course" 1402; "Registration!" 1403; "Take A Course Tour!" 1404; "How Do I . . . ?" 1405 and "Miscellaneous Stuff" 1406.

Figure 15:
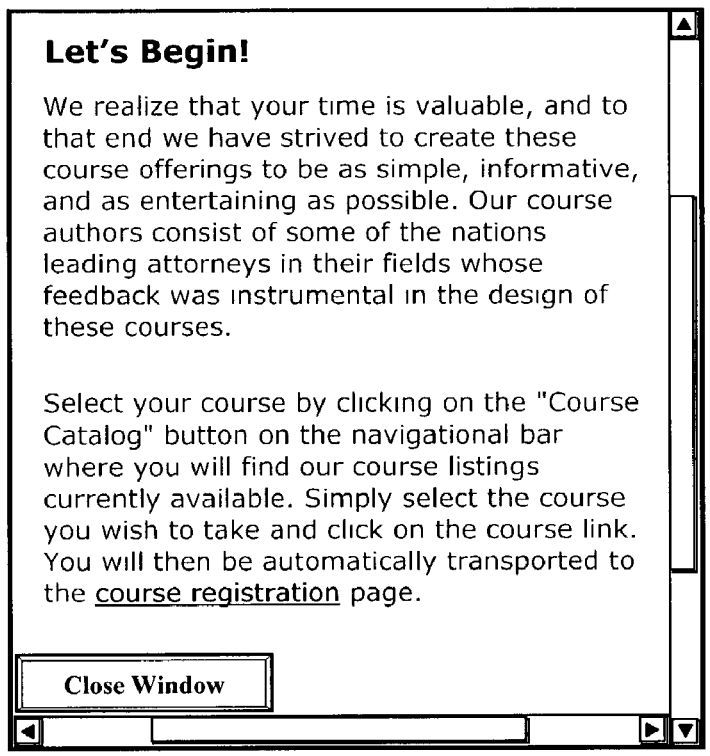
FIG. 15 illustrates screen shots that are representative of multimedia content that can be associated with methods for carrying of the present invention.

The "Let's Begin" tab 1401 if selected provides a brief overview of the course and how to begin. The Text of tab 1401 is shown in FIG. 15.

Figure 16:
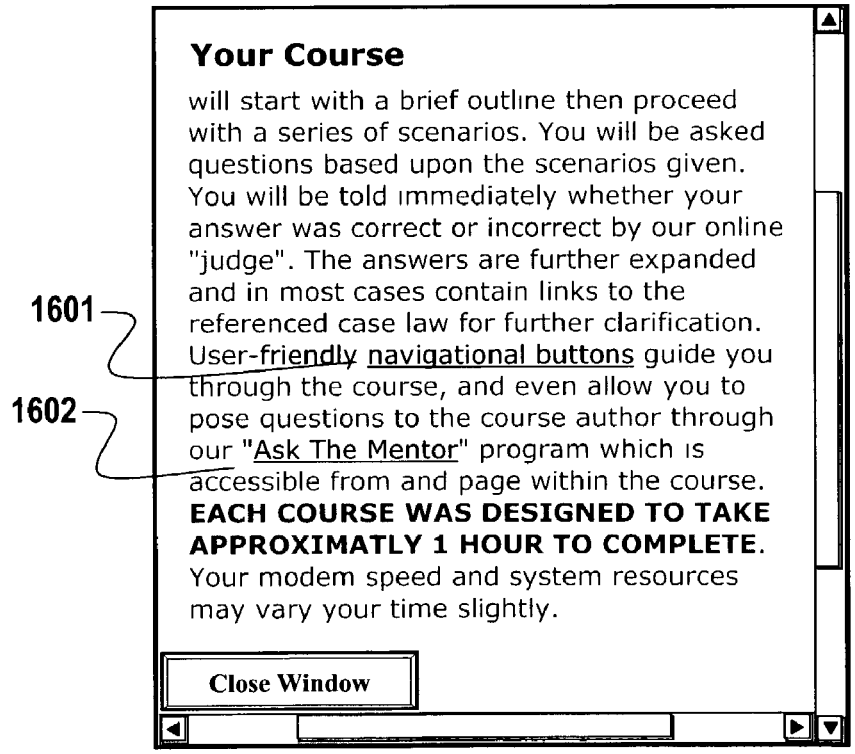
FIG. 16 illustrates screen shots that are representative of multimedia content that can be associated with methods for carrying of the present invention.

The "Your Course" tab 1402 if selected provides information on how courses work, navigation information, etc. The text of tab 1402 is shown in FIG. 16. FIG. 16 refers to user-friendly navigational buttons 1601 (hypertext link). The hypertext "Ask The Mentor" 1602 of FIG. 16 if selected can allow a student to enter their name, email address and a question or comment that is delivered via email to the course author.

Figure 17:
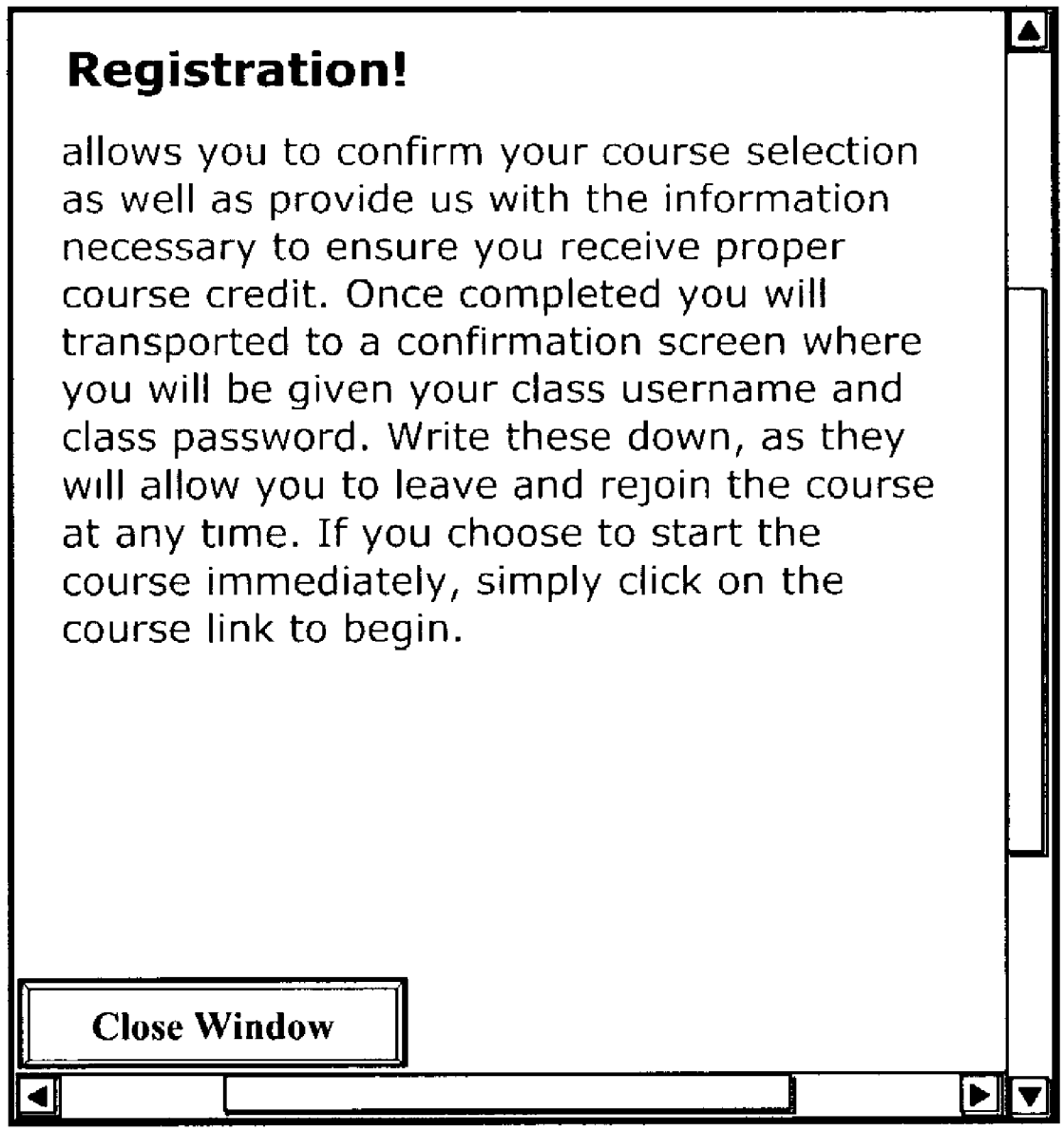
FIG. 17 illustrates screen shots that are representative of multimedia content that can be associated with methods for carrying of the present invention.

Referring back to FIG. 14A, the "Take A Course Tour!" 1404 if selected can provide a tour of a typical course on LawyersLearn.com. The "Registration!" tab 1403 if selected can provides how to register for courses. The text of this tab is shown in FIG. 17.

Referring to FIG. 18, an overview of the navigational buttons 1801 if provided to the user. The buttons 1801 ("YES", "NO", "MAYBE", "BACK" and "NEXT") are self explanatory in FIG. 18. Also explained to the user is that a course may be re-started if the user must log-out of the system, but does not want to lose his or her efforts. A user must log into the system when a course is initially started. Logging in to the system can require that a user have a registered LOGIN Name and password. A LOGON Name is generally accompanied by providing the account name used to gain access to a computer system. It can also be the act of entering into a computer system when the user computer is automatically recognized (e.g., via cookies, IP address).

A password is a code used by an authorized user to gain access to a locked computer system or program. Good passwords contain both alpha and numeric characters. Passwords are usually case (upper or lower) sensitive. Either or both the LOGON Name and Password can be replaced by biometric authentication technology (is described in detail above, FIG. 10). But if a course is terminated without completion, the cookies on the users computer will remember where the user was in the course and allow the user to re-enter or rejoin 1802 the training. The most common meaning of "Cookie" on the Internet refers to a piece of information sent by a Web Server to a Web Browser that the Browser software is expected to save and to send back to the Server whenever the browser makes additional requests from the Server. Depending on the type of Cookie used, and the Browser's settings, the Browser may accept or not accept the Cookie, and may save the Cookie for either a short time or a long time. Cookies might contain information such as login or registration information, online "shopping cart" information, user preferences, etc. When a Server receives a request from a Browser that includes a Cookie, the Server is able to use the information stored in the Cookie.

Also shown in FIG. 18 is an icon of a judge 1803. The judge 1803 ca be shown throughout a course after an answer to a question is properly or improperly rendered by the user. The example on FIG. 18 shows that the answer was correct.

Referring to FIG. 19, shown is text 1902 used when an answer is incorrect 1901. Also shown in FIG. 19 is text describing that case law relevant to a question can be hyperlinked for the user' convenience. Also discussed at FIG. 19 is that a Post Test can be provided at the end of a course. A user can seek assistance at different point throughout a course by clicking on the "contact support staff" button 1905. The student can enter their name, email address and question/comment that will then be delivered via email to customer service.

Referring to FIG. 20, text from what currently represents the first page of the course tour is shown. A course introduction 2001 is provided on the first page of every course. Navigational button "NEXT" 2002 is also shown.

Figure 21:
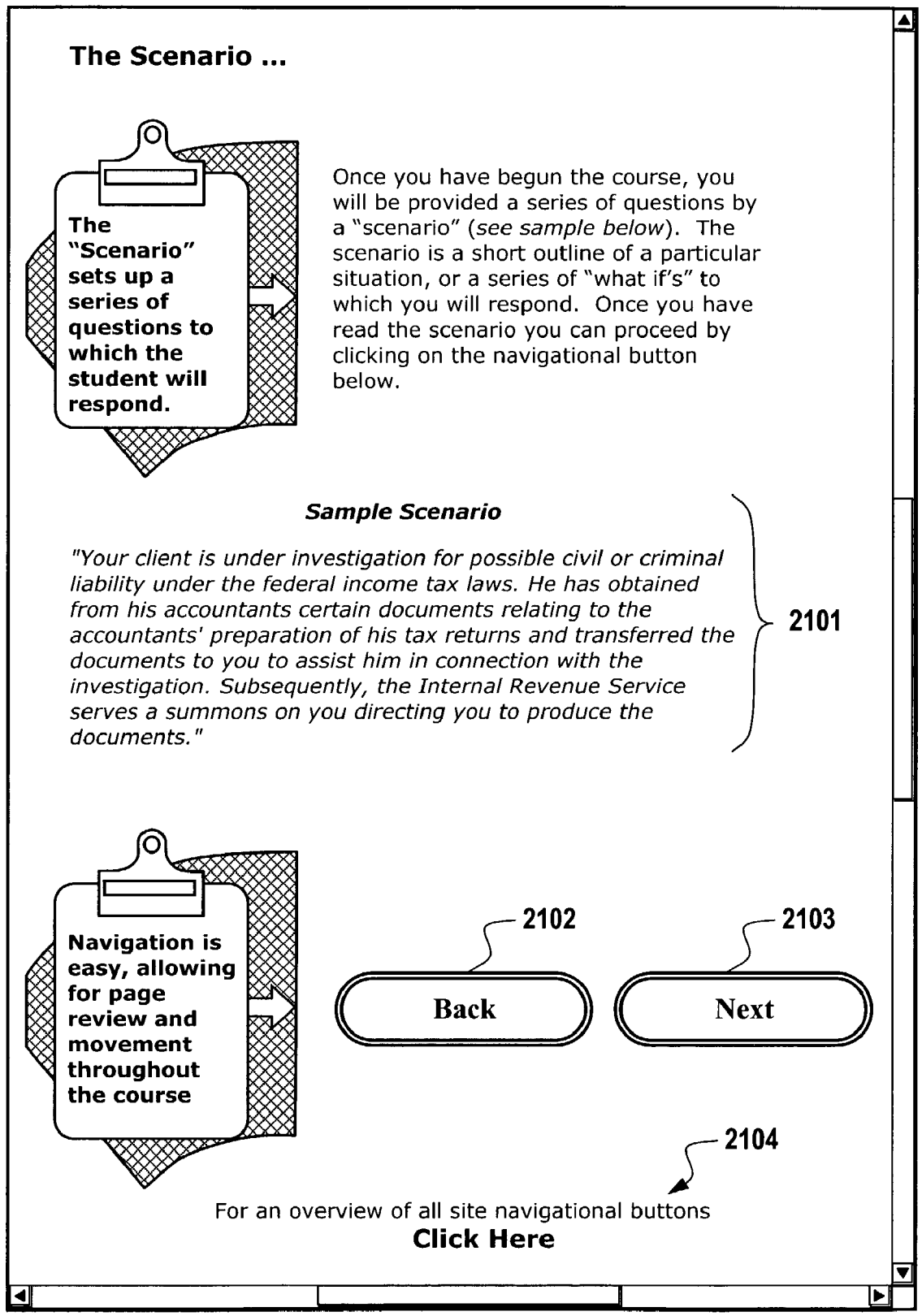
FIG. 21 illustrates screen shots that are representative of multimedia content that can be associated with methods for carrying of the present invention.

Referring to FIG. 21, a sample scenario 2101 is shown to the user. Also provided are BACK 2102 and NEXT 2103 navigational buttons. An overview 2104 of how to use navigational button is also provided for a user's recall.

Figure 22:
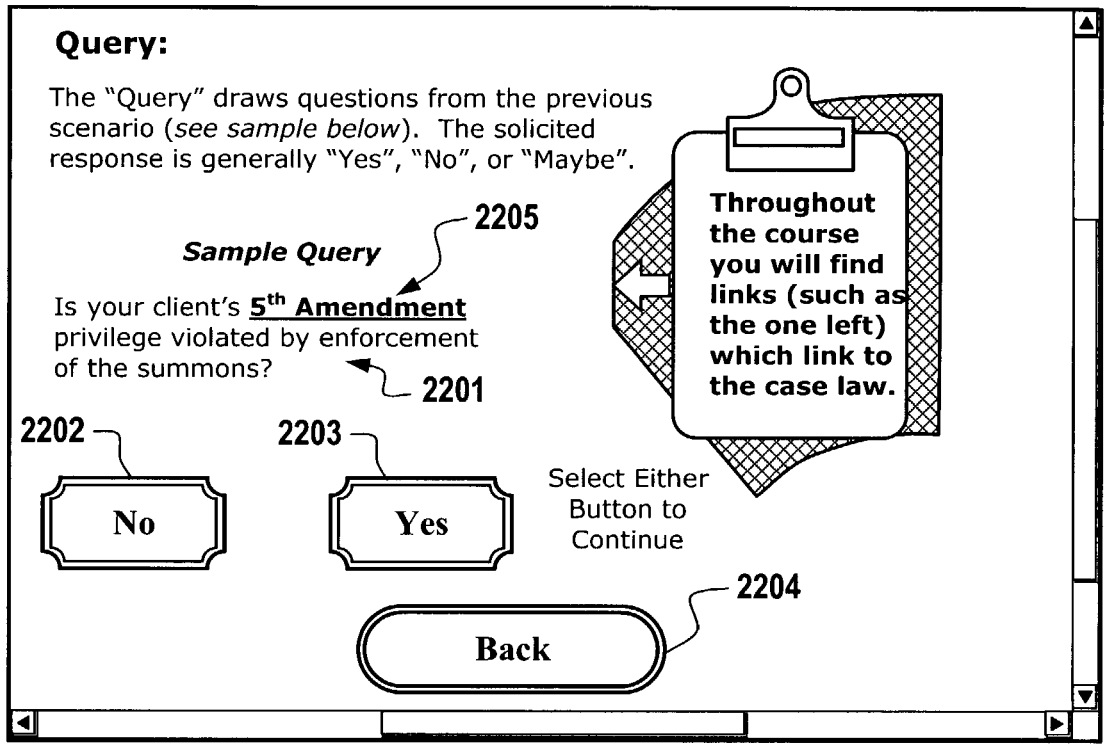
FIG. 22 illustrates screen shots that are representative of multimedia content that can be associated with methods for carrying of the present invention.
Figure 23:
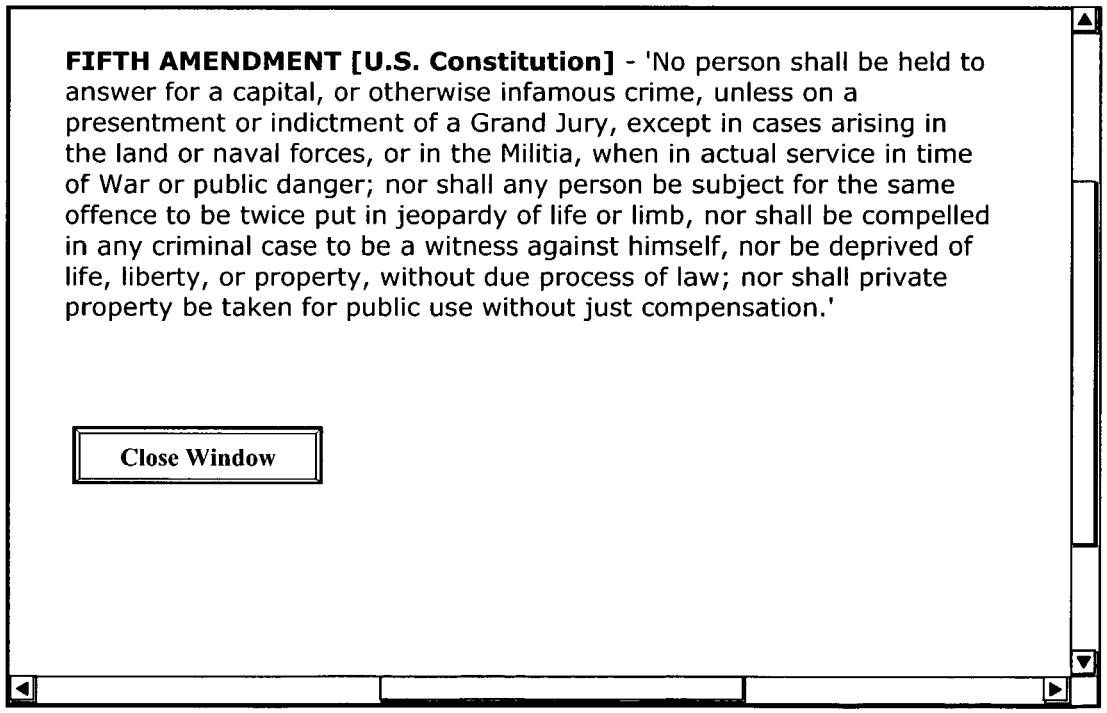
FIG. 23 illustrates screen shots that are representative of multimedia content that can be associated with methods for carrying of the present invention.

Referring to FIG. 22, a sample Query 2201 is provided to the user that is typically based on the previous scenario (FIG. 2100). Answer buttons "NO" 2202 "YES" 2203 and navigational button "BACK" 2204 is also provided. The user can go "BACK" 2203 if the scenario need to be reviewed prior to answering the query 2201. More information on the rule (e.g., $5^{th}$ Amendment) can also be provided through a hypertext link 2405. In the this case the user would click on the rule 2405 and can be provided a HTML window that provides the text for the rule as shown in FIG. 23.

Figure 24:
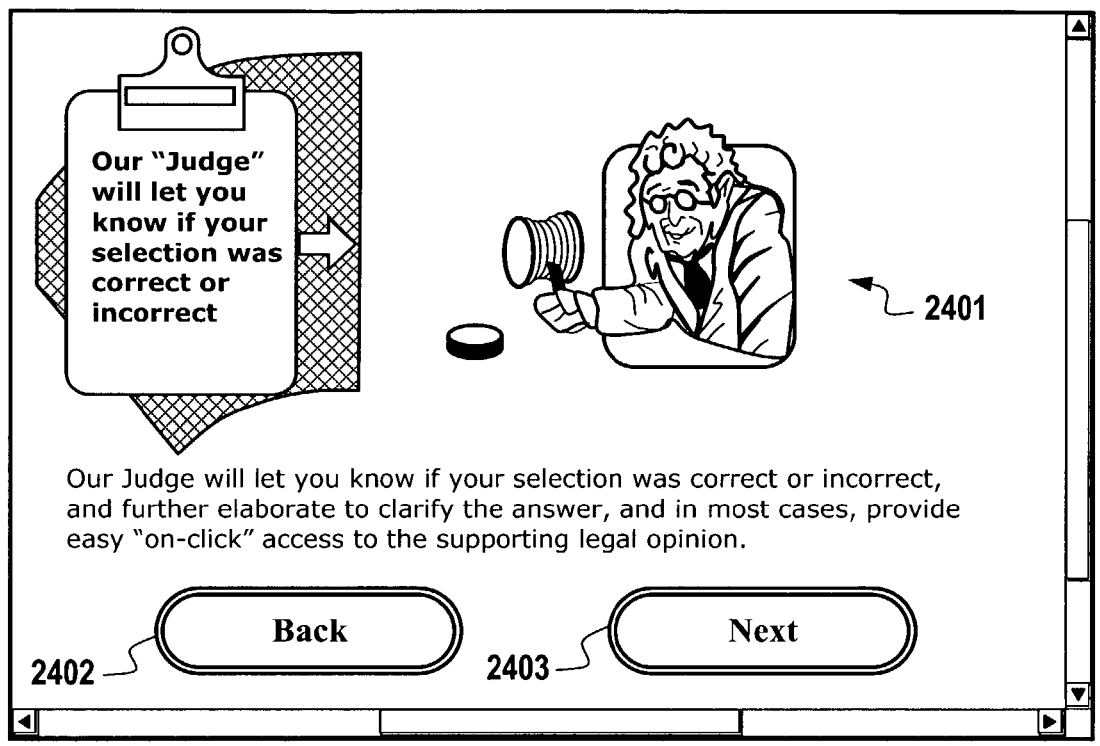
FIG. 24 illustrates screen shots that are representative of multimedia content that can be associated with methods for carrying of the present invention.

Referring to FIG. 24, once the Query is answered the judge 2401 will let the user no if he/she is right or wrong. The judge can also elaborate on why (rationale) the answer was right or wrong, or allow the user to access (hypertext) supporting case law or rules). The user can use the navigational buttons to go BACK 2402 or move on to the NEXT 2403 scenario.

Figure 25:
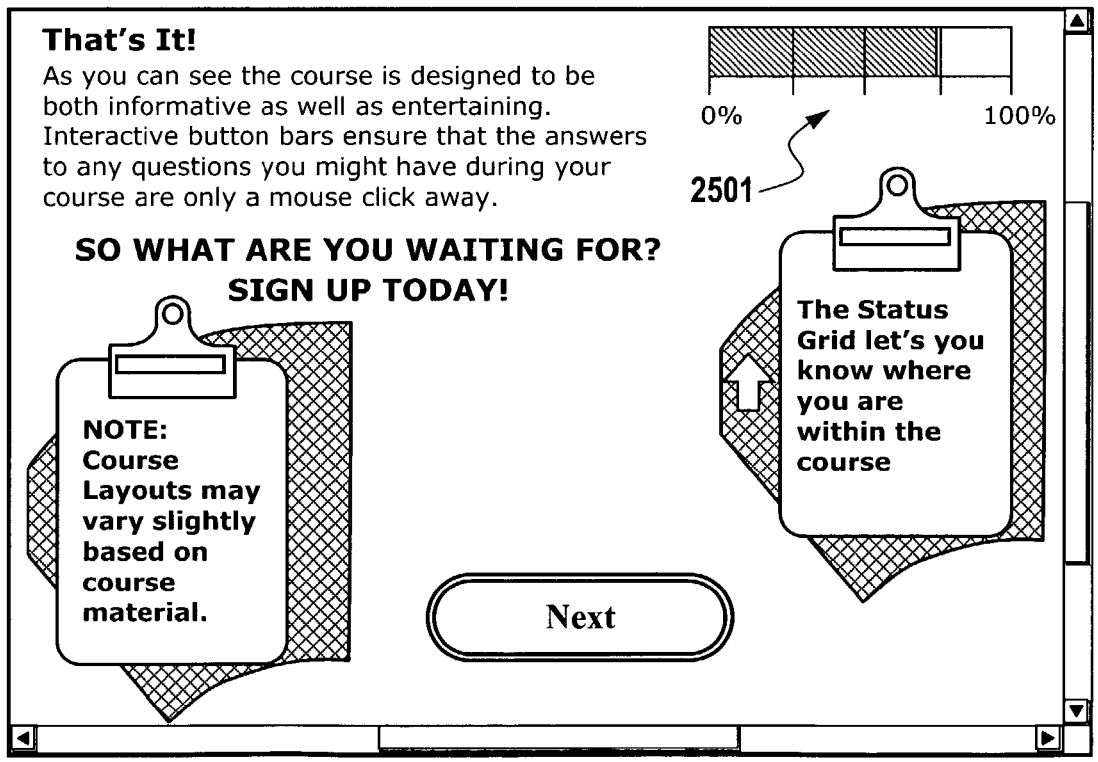
FIG. 25 illustrates screen shots that are representative of multimedia content that can be associated with methods for carrying of the present invention.

FIG. 25 shows a screenshot for the end of the tour. Also shown on this screen shot is a Grid 2501 that can be provided to show the user his or her status within a course (e.g., course completion status). The meter can show percentage complete or number of questions remaining, or other measurements that in the art that have or can be developed.

FIG. 26 shows the text for the final page of the Tour when final instructions can be given to the remote user, and a link to technical support staff can be provided.

Referring again to FIG. 14A, the "How Do I . . . ?" 1405 portion of the web page (illustrated screen shot) allows the user to click on hypertext located beneath the category as follows: "Book Mark A Page" 1411, "Contact Course Authors" 1412, Contact Technical Support" 1413, and Download Course Materials" 1414. These categories are believed to be self explanatory to those skilled in the art. A user can book mark 1411 their place in a course if necessary. It may not necessary to bookmark your course page if the user's browser is set to accept cookies, he/she can return to the last course page visited by clicking on the "Welcome Back" button on the Home Page. If the user wishes to bookmark either a course page for easy return, or to set this site as the user's home page, the user can click on a browser type for further instruction from the browser software.

Figure 14B:
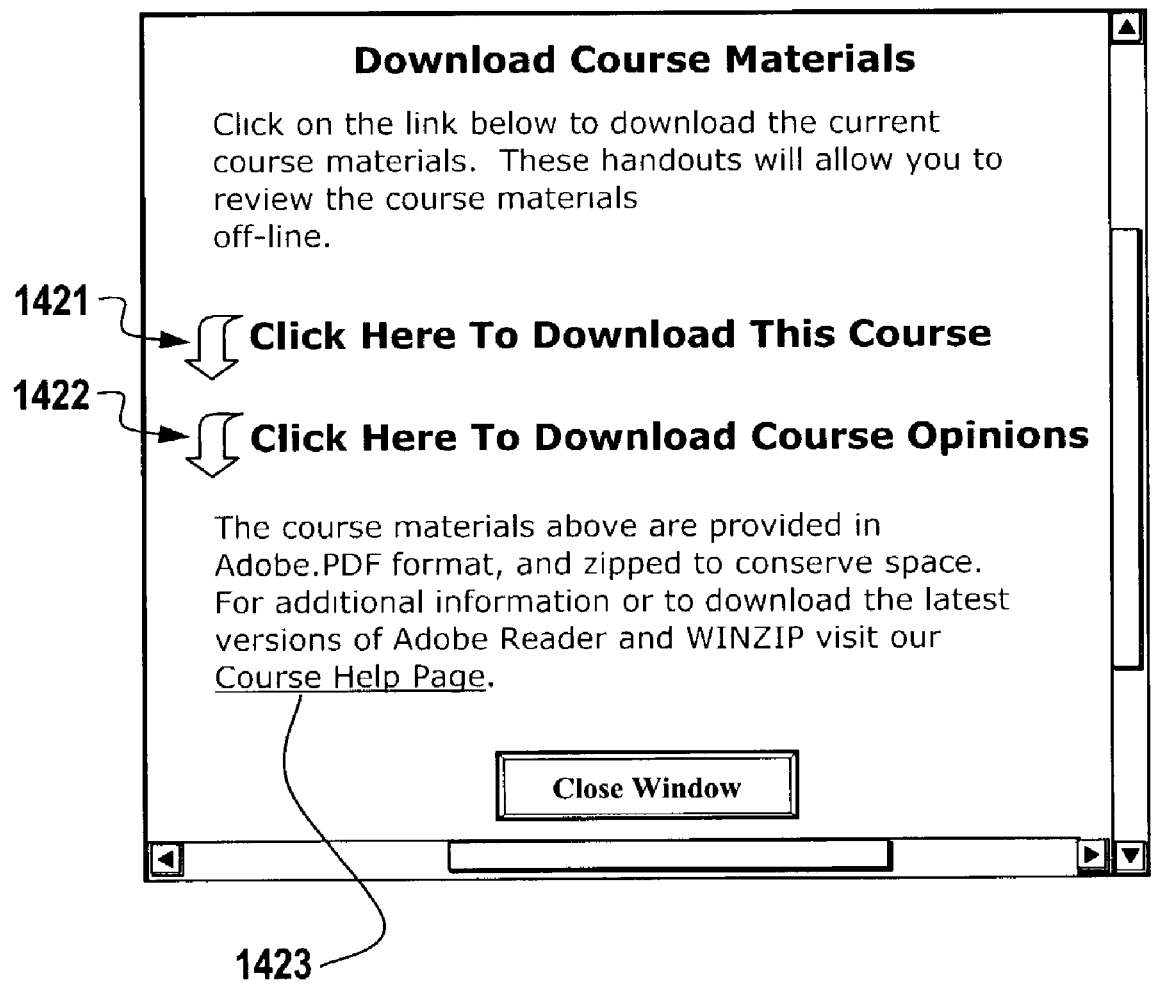
FIG. 14B illustrates screen shots that are representative of multimedia content that can be associated with methods for carrying of the present invention.

The study materials within a course can be made available for download, rather than streamed, so that they can be reviewed off-line. To download programs and documents, it is well known by those skilled in the art that a user can follow simple step-by-step instructions to complete document downloads. Files can be created as Portable Document Files (PDF) using "Adobe Acrobat", and zipped with "Win-Zip" to minimize the download time. A user must generally have supporting programs installed on your computer before a document or file can be downloaded or opened. For information on those programs, and/or to download the program(s) free, a user typically can click on the individual program icons on a Course Help page 1423, shown at FIG. 14B. From a course listing, such as shown in FIG. 30 (which is described in more detail later), a user can select the hypertext associated with a course, where a download window such as shown in FIG. 14B will later appear, which can allow a user to download a course and/or materials. FIG. 14B shows a "Download Course materials" screen shot with a button icon 1421 that can allows a user the choice of downloading a course. The user can also select a button 1422 to download course opinions. A user can also select a hyperlink 1423 to "visit our Course Help Page." It should be appreciated that a user can download either or both of the materials available on the download page. The download process can be repeated for each, or several, selections.

Once selections are made, a Window™-based "FILE DOWNLOAD" window, well known in the art, will open. The user can select "Save this file to disk" and click "OK". A Windows™-based "SAVE AS" window, also well known in the art, will then open prompting the user for the location on his/her computer's hard drive to save the file. The user can generally save files to a place the user can easily remember and access. Once the user has selected a location, the user can press the "SAVE" button on the SAVE AS window. Once the user has successfully downloaded the file(s), the user can double-click on the file to initiate the "unzip" process (follow unzip program instructions) and unzip the files. Once unzipped, a user will typically select (e.g., double-click) the file and it should automatically open utilizing, for example, the Adobe Acrobat™ Reader program.

Referring to the "Miscellaneous Stuff" 1406 area of the screen shot represented by FIG. 14A, the user is able to obtain software support that can be useful with services provided by LawyersLearn.com, and is also self-explanatory.

Figure 28:
FIG. 28 illustrates screen shots that are representative of multimedia content that can be associated with methods for carrying of the present invention.

Referring to FIG. 27, shown is the "Student Lounge" page referred to as Tab 1403 of FIG. 14. The student lounge allows user to connect to a chat room format of discussion with other student and legal scholars that may also be online with the legal training service provider. As shown in the figure, a user can select to connect to the chat room via FAST 2701 (e.g., ISDN) connection speed, or at a SLOW 2702 connection speed (e.g., 56 k modem). Once the student user as selected a connect speed, the user is directed to a login page where the student is asked to provide a name for identification during the chat session, as shown in FIG. 28.

Figure 29:
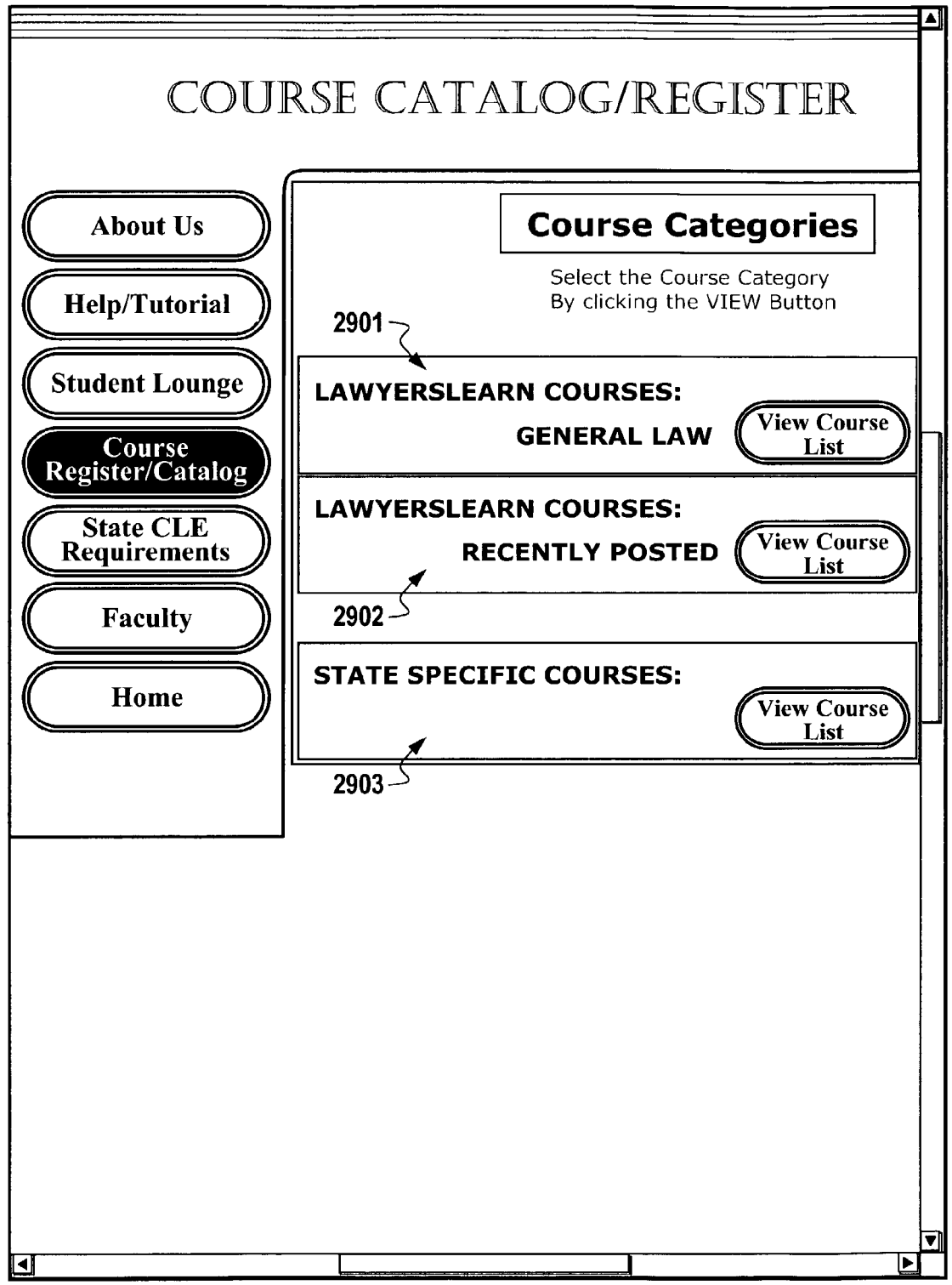
FIG. 29 illustrates screen shots that are representative of multimedia content that can be associated with methods for carrying of the present invention.

Referring to FIG. 29, general categories of course offerings are shown on the "Course Register/Catalog" page of the website (FIG. 14A, button 1404). Here a user is able to select courses based on different categories such as "General Law" 2901, "Recently Posted" 2902, and "State Specific" 2903. We can assume that the user is interested in "General Law" 2901 selections and therefore clicked or tapped on the hypertext associated with the category. The user is then taken to another page, shown at FIG. 30, where a more detailed listing of courses is provided for the user to select from.

Referring to FIG. 31, (associated with button 1406 of FIG. 14A) a listing of faculty (trainers, coaches, or the like) is provided for the user's review. A user may be interested in seeing more information on, for example, James Moore 3101. The user may select the hypertext or button associated with "James Moore" and be taken into Mr. Moore's detailed information as shown in FIG. 32. In FIG. 32, the user is provided with a bio 3201 on the instructor. The User can also select an audio interview (audio file) of Mr. Moore by selecting the Audio Interview button 3202. Optionally, additional photographs can be provided. The user can exit the biography page by clicking on the "Close Window" button 3204.

As can be seen from the foregoing discussion, training for all fields and professions has found it way through networks. Although most training has previously focused on a "wired" or physically "connected" environment, the following discussion illustrates how the present inventor has taken the online training environment to a level of mobility not presently enjoyed by users of electronic training environments.

Wireless Training

The previous discussion of FIGS. 10–32 has shown how a connected or "wired" presence can enhance the life of a legal professional required to engage in continuing legal education. The present inventor has now taken training as exemplified through the previously described multimedia examples into a format that can be provided to and utilized by a mobile trainee through a system that can utilize wireless communications and technologies.

Figure 33:
FIG. 33 illustrates screen shots that are representative of multimedia content that is associated with a method and system for carrying of the present invention.

Referring to FIG. 33, a screen shot for LawyersLearn.com's downloadable software channel for a service provider well known in the art as "AvantGo" is illustrated. Although AvantGO™ can be used for what will be described in the following textual description, it should be appreciated that a direct connection to a private enterprise server can also be used to obtain training capabilities in accordance with the overall teachings herein. AvantGo is but one convenient means to use the present invention and is well known by mainstream hand held device users. AvantGo is a trade name of AvantGo, Inc.

A user that wishes to utilize wireless training will typically download software needed to enable their handheld device to communicate with the training provider enterprise's equipment at a webpage similar to that shown in FIG. 33. The user click/selects downloadable software 3301 at or through the service provider website. Once the software is downloaded, the user can select courses from the training provider. In FIG. 33 two courses are shown to be available to the user, "Evidence/Hearsay 101" 3302 and "Ethics of Corporate Representation" 3303. The user selects the hypertext for the course of interest.

Figure 34:
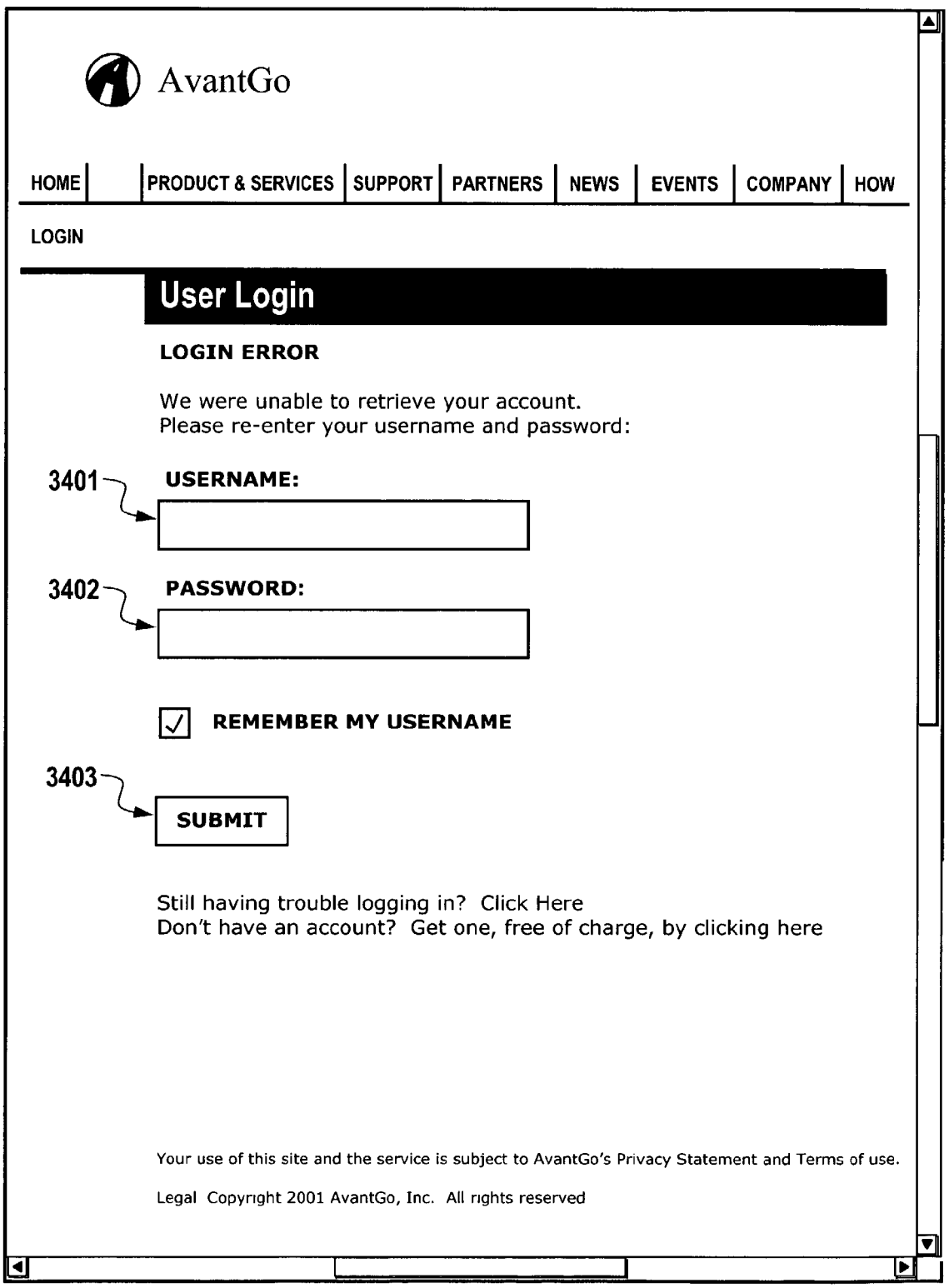
FIG. 34 illustrates screen shots that are representative of multimedia content that is associated with a method and system for carrying of the present invention.

A handheld device user can be required to log into the enterprise server in order to retrieve the course. In FIG. 34, the user is asked for a Username 3401 and Password 3402. Once Submitted 3403, the user is taken to a training course download page. The web page shown in FIG. 35 is again associated with AvantGO, but it should be appreciated that proprietary systems can be provided for user access as described and shown in FIGS. 10–32.

Figure 35:
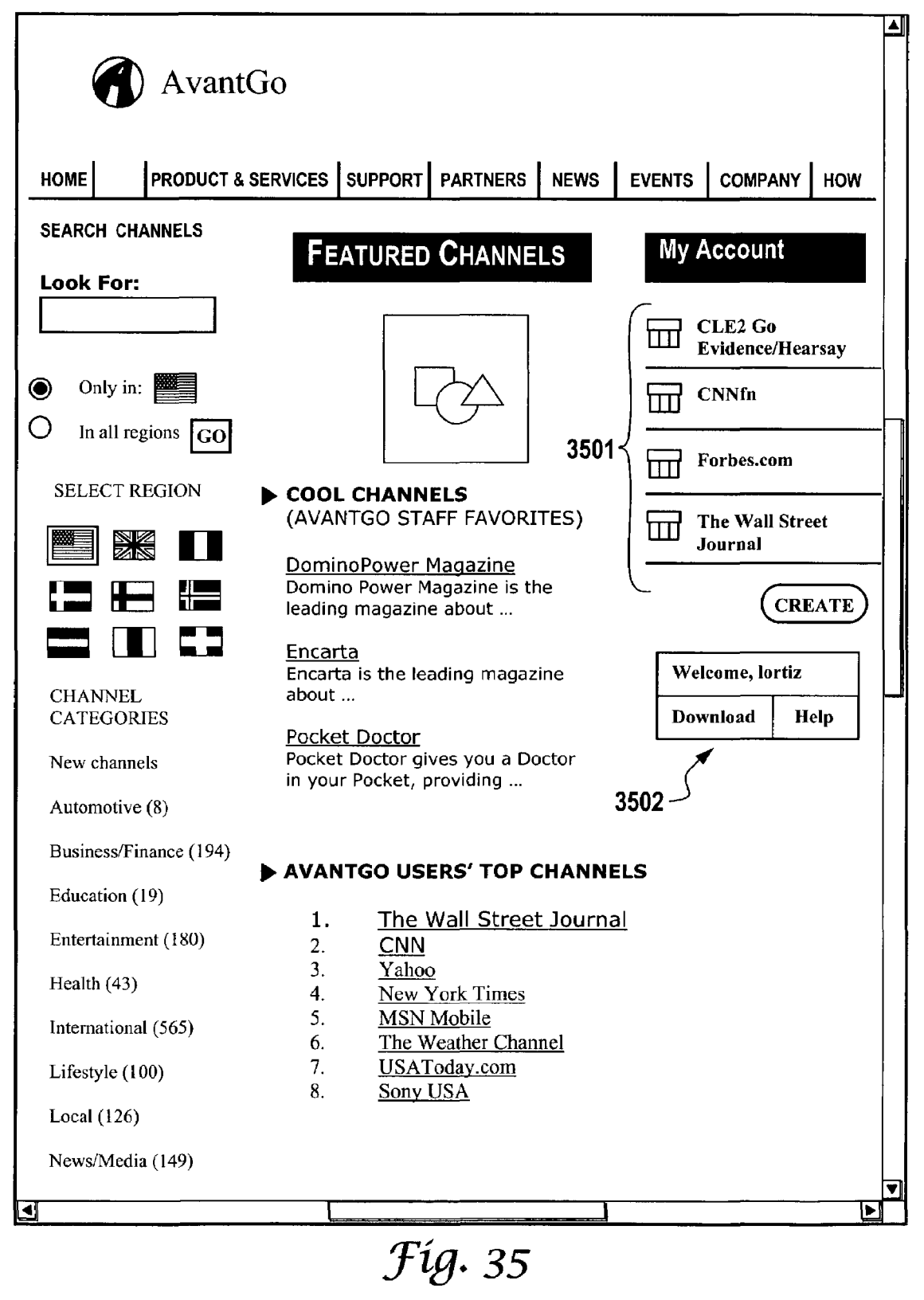

FIG. 35 illustrates that a user has been identified 3502 "Welcome lortiz" and is being provided with the option to synchronize his handheld with the website server to obtain new materials or refresh old materials/channels 3501. In the example of FIG. 35, it can be seen the user "Iortiz" has selected CLE2GO entitled "Evidence" for downloading to the handheld device. The user selects the "download button" 3302 to carry out the order.

Once the download of the course is completed, the user can be shown another screen, FIG. 36, where the order for "Evidence" 3601 is confirmed. With AvantGo, the user is also able to manage other content 3602 taken into the handheld device. The user can check an item that the user wishes to delete, and can then cause the selection to be deleted 3603. It should be appreciated that a similar content management method can be used for a proprietary training enterprise system to manage the addition and deletion of courses and associated training content. It should also be appreciated that courses can be downloaded to a handheld device directly from a wireless network connection using a micro browser, or downloading can be carried out using a synchronization routine and cradle tied to a PC. Such methods and hardware have been well described in FIGS. 1–5.

Once a user has downloaded a course, the user can begin a course. The user or "trainee" can select the course from a dedicated training file stored in the handheld (e.g., "LawyersLearn.com CLE2GO"). The training course is selected by using the handheld GUI, typically a touch sensitive screen.

Once the user selects the course on the handheld wireless device, the user may be greeted by text such as: "You are about to participate in the latest technological advancement in Continuing Legal Education. This course, designed for palm-style applications and computers, has been created specifically with the hectic schedule of today's practicing attorneys in mind. Now CLE requirements can, be achieved virtually anywhere and at any time. Once you have completed the course, re-sync you palm-style device and your course information and post-test will be transferred to our database automatically. You will receive a course completion certificate via email within 48 hours. Thank you again for allowing us to be your source for CLE!"

A course can proceed similarly to the detailed description of FIGS. 15–26. The electronic handheld course can provide the user with automatic breaks at the 25%, 50% and 75% levels of completion for a one-hour course. When provided a break, the user may be greeted by text like the following: "'You Deserve a Break'. You have completed [25%/50%/75%] of the course. Stand up! Stretch you legs, and grab something cold to drink before we move on. When you're ready to continue, click on the "next" button. If you wish to log off and complete the course at a more convenient tie, no problem! The training software makes it a snap. If you close your program down and log off, once you re-enter you will automatically be returned to this page where you can click the "next" link below to continue your course."

During a wireless handheld course, the user can be provided with scenarios (e.g., text, or streaming video vignettes). Streaming video can utilize the support of an active connection to the server in order to retrieve video files, assuming the handheld device lack sufficient memory. The user can be asked questions during and after the course. During the course, a judge can provides a ruling (correct/incorrect) for the answer provided by the user. The judge can also provide support for the ruling (e.g., legal rules, case law, reference manuals, etc.). For legal CLE as an example, the judge can provide rules of law, provides another scenario, asks questions of the user, provides additional ruling, and/or provides further rational through case law.

At completion of the handheld wireless course the user may be present with the following text: "You are almost finished. There are two more things we request that you do in order to help us evaluate the course and to make sure you receive credit for you participation. First is a quick post test consisting of 10 questions. Even though you will not be passed or failed based on your answers, give this a good shot. Keep in mind that a simple "true"/"False" answer may not cover the actual depth of the subject matter in all situations, based upon the course materials each question has a logical and legal basis. Finally, in order to receive credit, please fill out and submit the Evaluation and Certificate of Attendance also on this page."

The user can proceed by selecting the <NEXT> button on the screen. The user is then presented with post test questions. The questions can be provided as true/false, multiple choice, or write in answers. If True/False or multiple guess applies, then the user may select the appropriate radial dial button or hypertext associated with the perceived right answer. Course evaluations can be provided where the user can select a range (e.g., drop down buttons rating from 1–7, 7 being the highest). The Evaluation can also seek write-in comments.

Additional information can be requested at the end of a course for a user to get certified, or for a certificate to be completed for the user. The user can be asked for information as follows:

Certificate of Attendance

Last Name: _____

First name: _____

BPR or Professional License #: _____

E-Mail: _____

Please check the boxes below:

[] I have taken the entire Ethics of Corporate Representation 101 online seminar

[] Please Credit me with 1.0 CLE Hour for this online seminar

[] I certify the foregoing to be complete and accurate

[] You have my permission to share my above comments (in whole or in part) with others.

The user can then submit the information, post test and/or evaluation by selecting a button, for example "[SUBMIT POST TEST]."

The post test can be submitted immediately where a wireless connection is used, during the next wireless communication session, or during the next synchronization with a PC if the handheld device does not have wireless communication capabilities. Once the training provider receives the course completion information, recording, certification and/or reporting activities, among other processing, can be carried out.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of managing training completed remotely at a hand held device, said method comprising the step of:
receiving at a training server training data transmitted to the training server through a data network from a user of a hand held device, the training data representing training taken by the user at hand held device;
receiving identifying information for the user of a hand held device concurrently with the training data file;
identifying the user of the hand held device;
authenticating the identify of the user of the hand held device by requesting authentication data from the user and comparing the authentication data with a master user identification template containing authentication data associated with the user and accessible by the training server to determine if said comparison authenticates the user's identify as an authorized trainee;
recording the training data in memory associated with the training server;
locating at least one training file contained within the training data;
determining status of the training file by comparing the training file with an associated master training template accessible from memory by the training server, the status including a determination if training represented by the training file meets a set criterion including at least one of: pending, incomplete, failed, passed; and
recording training status in memory.

2. The method of claim 1 wherein the authentication data includes at least one of: a username, at least one password, at least one biometric template.

3. The method of claim 2 wherein said step of authenticating the identify of the user includes comparing the biometric template with a master biometric template associated with the user.

4. The method of claim 1 further comprising the step of providing training status from the training server to at least one of: the user, or at least one third party associated with the user.

5. The method of claim 1, further including the step of certifying that training taken by the user of the hand held device is complete by providing notice to at least one of: the user, or a third party associated with the user.

6. The method of claim 5, wherein the notice is provided in the form of at least one of: electronic mail automatically generated by the training server; a printable letter automatically generated by training server, a printable certificate automatically generated by the training server; a facsimile automatically generated by the training server.

7. A method for managing training completed remotely at a hand held device, said method comprising the step of:
receiving at a training server training data transmitted to the training server through a data network from a user of a hand held device, the training data representing training taken by the user at a hand held device;
receiving user identifying information for the user of a hand held device, the user information received concurrently with the training data file;
identifying the user of the hand held device;
authenticating the identify of the user of the hand held device by requesting authentication data from the user and comparing the authentication data with a master user identification template containing authentication data associated with the user and accessible by the training server to determine if said comparison authenticates the user's identity as an authorized trainee;
recording the training data in a memory associated with the training server;
locating at least one training file contained within the training data;
determining status of the training file by comparing the training file with an associated master training template accessible from memory by the training server, the status including a determination if training represented by the training file meets a set criterion including at least one of: pending, incomplete, completed, failed, passed; and
recording training status in memory.

8. The method of claim 7 wherein the authentication data includes at least one of: a username, at least one password, at least one biometric template.

9. The method of claim 8 wherein said step of authenticating the identity of the user includes comparing the biometric template with a master biometric template associated with the user.

10. The method of claim 7 further comprising the step of providing training status from the training server to at least one of: the user, or at least one third party associated with the user.

11. The method of claim 7, further including the step of certifying that training taken by the user of the hand held device is complete by providing notice to at least one of: the user, or a third party associated with the user.

12. The method of claim 11, wherein the notice is provided in the form of at least one of: electronic mail automatically generated by the training server; a printable letter automatically generated by the training server, a printable certificate automatically generated by the training server; a facsimile automatically generated by the training server.

13. A system for managing training completed remotely at a hand held device, said system comprising:
a training server, said training server adapted for receiving and processing training data transmitted from a user of a hand held device through an electronic data network from a hand held device, wherein said training server can locate at least one training file contained within the training data, determine the status of the training file by comparing the training file with an associated master training template stored in and accessible from memory by said training server, the status including a determination if training represented by the training file meets training criterion including at least one of: pending, incomplete, completed, failed, passed, said training server further adapted to receive identifying information for users of hand held devices and to authenticate the identify of users of the hand held devices, wherein said training server can request authentication data from users, compare the authentication data with a master user identification templates stored in said memory and containing authentication data associated with users, and determine if a user's identify compares with a master user identification template;
electronic data network communication hardware, said electronic data network communication hardware providing said server access to electronic data networks; and
memory accessible by said training server, said memory for recording training data, at least one training file, at least one master training template, training criterion, and training status.

14. The system of claim 13, said training server adapted to receive and process authentication data including at least one of: a username, at least one password, at least one biometric template.

15. The system of claim 14, said training server further adapted to authenticating the identity of users by comparing biometric samples provided by users with master biometric templates associated with authorized users.

16. The system of claim 13, said training server further adapted to providing training status to at least one of: a training server user, or at least one third party associated with the training user.

17. The system of claim 13, said training server further adapted to certify that training taken by users has been completed by electronically providing notice to at least one of: the user, or a third party associated with the user.

18. The system of claim 17, wherein the notice is provided in the form of at least one of: electronic mail automatically generated by said training server; a printable letter automatically generated by said training server, a printable certificate automatically generated by said training server; a facsimile automatically generated by said training server.

* * * * *